(12) United States Patent
Torlak et al.

(10) Patent No.: US 12,483,595 B2
(45) Date of Patent: Nov. 25, 2025

(54) AUTHORIZATION POLICY EVALUATION

(71) Applicant: Amazon Technologies, Inc., Seattle, WA (US)

(72) Inventors: Emina Torlak, Seattle, WA (US); Darin Mcadams, Bremerton, WA (US); Neha Rungta, San Jose, CA (US); Michael W. Hicks, Silver Spring, MD (US); Craig Ryan Disselkoen, Alexandria, VA (US); Aaron Joseph Eline, Reisterstown, MD (US); John Holman Kastner, Washington, DC (US); Kyle Headley, Arlington, VA (US); Anwar Mamat, Chantilly, VA (US); Richard Matthew Mccutchen, Rockville, MD (US); Andrew Marshall Wells, Cupertino, CA (US); Kesha Hanne Hietala, Odenton, MD (US); Shaobo He, San Jose, CA (US); Mark Edward Stalzer, Arlington, VA (US); Julian Lovelock, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

(21) Appl. No.: 18/070,321

(22) Filed: Nov. 28, 2022

(65) Prior Publication Data
US 2024/0179181 A1 May 30, 2024

(51) Int. Cl.
*H04L 29/06* (2006.01)
*H04L 9/40* (2022.01)

(52) U.S. Cl.
CPC ............ *H04L 63/20* (2013.01); *H04L 63/104* (2013.01)

(58) Field of Classification Search
CPC ..... H04L 63/20; H04L 63/104; H04L 63/107; H04L 63/10; H04L 63/0263; H04L 63/108
See application file for complete search history.

(56) References Cited

U.S. PATENT DOCUMENTS 10,673,905 B1  6/2020  Chud
10,979,461 B1 * 4/2021  Cervantez ............. H04L 63/105
11,368,457 B2 * 6/2022  Arora ..................... G06N 3/044
(Continued)

FOREIGN PATENT DOCUMENTS

CN      103309922 A    9/2013
WO     2019/005511 A1   1/2019

OTHER PUBLICATIONS

Notice of Allowance, U.S. Appl. No. 18/070,349, filed Nov. 21, 2024, 10 pages.
(Continued)

*Primary Examiner* — Longbit Chai
(74) *Attorney, Agent, or Firm* — Nicholson De Vos Webster & Elliott LLP

(57) ABSTRACT

A system and method for authorization policy evaluation. Authorization policies are authored in a general-purpose authorization language. An evaluation engine is used in a provider network by application developers to manage access within their applications based on fine-grained permissions. The policy language combines elements of role-based and attributed-based access control within an intuitive syntax and efficient evaluation strategy. The policy syntax separates role-based expressions of a policy from attribute-based expressions of the policy.

20 Claims, 18 Drawing Sheets

(56) References Cited

U.S. PATENT DOCUMENTS

| | | |
|---|---|---|
| 11,593,525 B1 | 2/2023 | Sandall et al. |
| 11,722,527 B2 | 8/2023 | Mccarty et al. |
| 2009/0077618 A1 | 3/2009 | Pearce et al. |
| 2010/0191843 A1 | 7/2010 | Bohm |
| 2011/0302622 A1 | 12/2011 | Bregman et al. |
| 2012/0297492 A1 | 11/2012 | Court |
| 2013/0238659 A1 | 9/2013 | Roitman et al. |
| 2014/0189783 A1 | 7/2014 | Kapoor et al. |
| 2015/0089575 A1 | 3/2015 | Vepa et al. |
| 2015/0220419 A1 | 8/2015 | Cassez et al. |
| 2016/0315965 A1 | 10/2016 | Sastry et al. |
| 2017/0264643 A1 | 9/2017 | Bhuiyan et al. |
| 2019/0190959 A1 | 6/2019 | Yuan |
| 2022/0138644 A1 | 5/2022 | Sharma et al. |

OTHER PUBLICATIONS

AWS, "AWS Identity and Access Management—User Guide", Available Online at <https://web.archive.org/web/20220120055317/https://docs.aws.amazon.com/IAM/latest/UserGuide/iam-ug.pdf>, Jan. 19, 2022, 883 pages.

International Search Report and Written Opinion, PCT App. No. PCT/US2023/080793, Feb. 20, 2024, 14 pages.

Open Policy Agent Org, "Open Policy Agent Documentation", Available Online at <https://web.archive.org/web/20221126155938/https://www.openpolicyagent.org/docs/latest/>, Nov. 26, 2022, 27 pages.

Stone et al., "Network Policy Languages: A Survey and a New Approach", IEEE Network, Jan./Feb. 2001, pp. 10-21.

Clara Bertolissi, Daniel Ricardo dos Santos, Silvio Ranise, "Automated Synthesis of Run-time Monitors to Enforce Authorization Policies in Business Processes", Asia CCS'15, Apr. 14-17, 2015, pp. 297-308. (Year: 2015).

Non-Final Office Action, U.S. Appl. No. 18/070,349, filed Aug. 2, 2024, 8 pages.

Non-Final Office Action, U.S. Appl. No. 18/070,371, filed Sep. 29, 2024, 19 pages.

Final Office Action, U.S. Appl. No. 18/070,371, filed Mar. 20, 2025, 21 pages.

International Preliminary Report on Patentability, PCT App. No. PCT/US2023/080793, Jun. 5, 2025, 10 pages.

Notice of Allowance, U.S. Appl. No. 18/070,371, filed Jun. 2, 2025, 7 pages.

Examination Report, GB App. No. 2510312.8, Jul. 23, 2025, 01 page.

Notice of Allowance, CN App. No. 202380082273.2, Aug. 25, 2025, 07 pages (03 pages of English Translation and 04 pages of Original Document).

Notice of Allowance, U.S. Appl. No. 18/070,371, Jul. 25, 2025, 2 pages.

* cited by examiner

```
01: PERMIT {
02:     PRINCIPAL IN GROUP::"JANE/FAMILY" &&
03:     ACTION == ACTION::"VIEW" &&
04:     RESOURCE IN ALBUM::"JANE/ART" &&
05:     RESOURCE.KB <= 2000 &&
06:     RESOURCE.TAGS.CONTAINS("NATURE")
07: };
```

COMBINED AUTHORIZATION POLICY 502

Let $C$ be the set of an application's policies, including all the inline policies and policy instances, and $H$ its entity hierarchy. Let $I = \langle P, A, R, X \rangle$ be an authorization request and define two sets, $C_I^- \subseteq C$ and $C_I^+ \subseteq C$, with respect to $I$ as follows. The set $C_I^-$ consists of all restriction policies $c_- \in C$ that are satisfied by $I$, i.e., $C_I^- = \{c_- \in C \mid \mathit{Effect}(c_-) = \mathit{Deny} \land \mathit{IC-1}_H(I)\}$. The set $C_I^+$ consists of all permission policies $c_+ \in C$ that are satisfied by $I$. Given these sets, the authorization output $\langle dec, reason, error \rangle \in \{\mathit{Allow}, \mathit{Deny}\}$ for $I$ is determined as follows:

- If $C_I^+$ is empty or $C_I^-$ is not empty, then $dec = \mathit{Deny}$ and $reason = \{\mathit{PolicyID}(c_-) \mid c_- \in C_I^-\}$.
- Otherwise, $dec = \mathit{Allow}$ and $reason = \{\mathit{PolicyID}(c_+) \mid c_+ \in C_I^+\}$.
- $error = $ All the evaluation error messages

*FIG. 8*

SCHEMA 1200

```
RequestSchema {
        principal: Employee,     // Entity type Employee
        action: Action,          // Entity type Action
        resource: Document,      // Entity type Document
        context: {}              // Empty record type
}

EntitySchema {
        Employee: {
                attributes: {
                        jobLevel: Long,
                        numberOfLaptops: Long,
                        addresses: Set<{        // Set of records where
                                street: ?String,  // street is optional, and
                                zip: String       // zip is required.
                        }>
                },
                memberOf: [Team, Department]
        },
        Team: {
                attributes: {
                        name: String
                },
                memberOf: [Department]
        },
        Department: {
                attributes: {
                        name: String
                },
                memberOf: [Department]
        },
        Document: {
                attributes: {
                        name: String,
                        author: ?String           // author is optional
                }
        },
        Action: {
                attributes: { }
        }
}
```

*FIG. 12*

SYMBOLIC RECORD TYPES 1500

```
R0 { }   // Empty record type

R1 {     // Employee record type
         jobLevel: Long,
         numberOfLaptops: Long,
         addresses: Set<R2>
}

R2 {     // Address record type
         street: Option<String>, // Optional attributes are wrapped in the Option type
         zip: String
}

R3 {     // Team and Department record type
         name: String
}

R4 {     // Document record type
         name: String,
         author: Option<String>
}
```

*FIG. 15*

AUTHORIZATION POLICY EVALUATION

TECHNICAL FIELD

The present disclosure relates generally to computer security, and more specifically to a new and useful system and method for authorization policy evaluation.

BACKGROUND

Provider network (equivalently "cloud") computing provides on-demand access to provider network resources via the Internet or other intermediate network. Accessing resources in the provider network is made secure by user-specified access control polices. An access control policy is an expressive specification of what resources can be accessed, by whom, and under what conditions. Properly configured polices are important part of an organization's security posture.

The scale and diversity of provider network-based services is constantly growing. For example, a provider network may encompass serverless computing services, streaming analytics services, edge computing services, among many other possible services. Each new provider network service offering used by an organization often requires a different access policy configuration. As a further complication, customers combine provider network services to implement an overall application, which increases the complexity of the governing access control polices. Thus, a challenge to customers of a provider network is reasoning about static access control polices for their dynamic provider network-based applications. Customers would appreciate solutions that allow them to check their policy configurations based on their security requirements. The present disclosure provides a solution to this and other needs.

BRIEF DESCRIPTION OF DRAWINGS

Various examples in accordance with the present disclosure will be described with reference to the drawings, in which:

FIG. 5 illustrates alternative example syntax of an authorization policy language.

FIG. 8 presents an authorization semantics definition.

FIG. 12 presents an example policy language schema.

FIG. 15 presents example symbolic record types.

Figure 1:
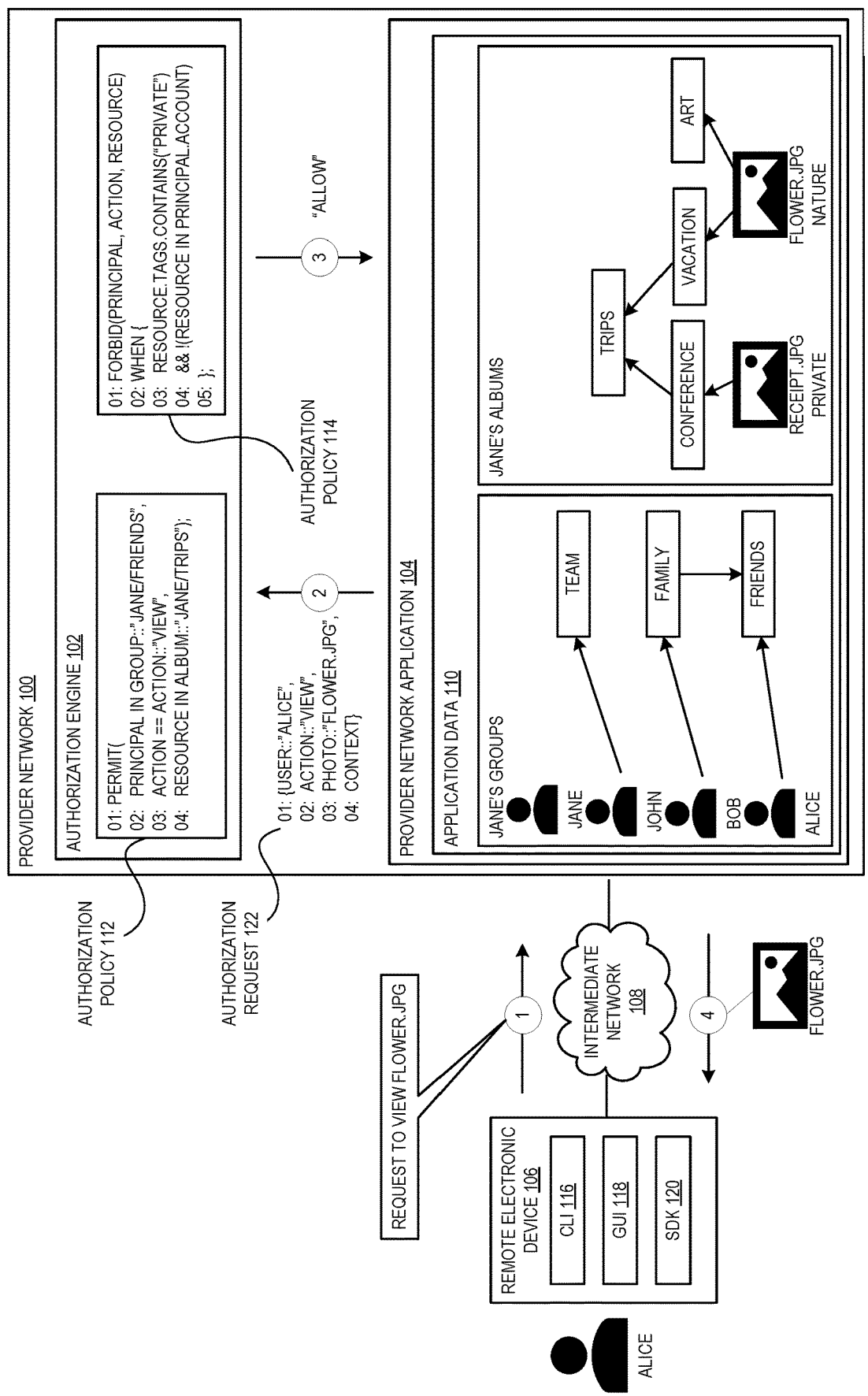
FIG. 1 illustrates an example authorization policy language system in a provider network.

It will be appreciated that for simplicity or clarity of illustration, elements illustrated in the figures have not necessarily been drawn to scale. For example, the dimensions of an element may be exaggerated relative to another element for clarity. Further, if considered appropriate, reference numerals have been repeated among the figures to indicate corresponding or analogous elements.

DETAILED DESCRIPTION

The following description is not intended to limit the invention to the examples described, but rather to enable any skilled person in the art to make and use this invention.

Overview

Systems, methods, and non-transitory computer-accessible media (collectively "techniques") for an authorization policy language system and method are disclosed that allows users to govern access to application resources in a provider network. The permissions granted by a policy are based on the interactions of different statements and conditions. The policy language system and method supports statements that grant access (allow statements) or deny access (forbid statements). Conditions within statements can be based on access details such as the source address, encryption, and other configuration options.

In some aspects, the techniques disclosed herein encompass a system and method for authorization policy analysis. A policy analyzer answers first-order questions about authorization policies by reducing the policies to Satisfiability modulo theories (SMT). Input to the analyzer includes a policy to be analyzed and a schema for that policy. If the policy passes strict validation against the schema, then the analyzer symbolically evaluates the policy to encode its semantics as an SMT expression. The SMT expression is used for formulate a desired query about policy behavior such as, for example, if there is any input on which two policies both evaluate to true. The reduction to SMT produces a quantifier-free formula in a combination of decidable theories to support large scale deployments. This reduction is achieved by focusing the analysis on policies that pass strict validation, rather than attempting to analyze arbitrary policies.

In some aspects, the techniques disclosed herein encompass a system and method for authorization policy evaluation. Authorization policies are authored in a general-purpose authorization language. An evaluation engine is used in a provider network by application developers to manage access within their applications based on fine-grained permissions. The policy language combines elements of role-based and attributed-based access control within an intuitive syntax and efficient evaluation strategy. The policy syntax separates role-based expressions of a policy from attribute-based expressions of the policy.

In some aspects, the techniques disclosed herein encompass a system and method for authorization policy validation. A validator takes as input an authorization policy to be analyzed and a schema that specifies entity types and their attributes, types of entity parents in an entity hierarchy, and which entity types can be used with which actions. The validator checks that the policy conforms to the schema. If the check passes, then the policy is guaranteed to be free of both type errors and attribute access errors for any input that conforms to the schema.

Policy Language Overview

The techniques encompass a domain specific policy language for authorization. The policy language system and method provides easy to use syntax and semantics, a fast and safe runtime, and powerful static analysis tools. Authorization is critical to security. Therefore, the policy language system and method provides a high degree of assurance using techniques such as automated reasoning and differential testing.

Generally speaking, authorization is the process of determining who has access to what in a multi-user system such as, for example, a multi-user application built using provider network infrastructure (equivalently a "provider network application.") More specifically, authorization determines whether a principal can perform an action on a resource. For example, the principal could be a user of a provider network application. In this example, authorization could involve determining whether the user has permission to perform a specific action (e.g., view) on a resource (e.g., a digital photo) managed by the application.

While a provider network application can perform authorization itself, a better practice is to delegate authorization decisions to a dedicated authorization engine. To facilitate this, the authorization engine provides an application programming interface or API. The API accepts as input a four-tuple representing a request for authorization (equivalently "authorization request"). The four tuple specifies a principal, an action, a resource, and a request context. The request context contains contextual information about the authorization request. The contextual information may include information such as a network address, a current date timestamp, a set of key value pairs (equivalently a set of "tags"), or any other suitable request context information.

The authorization engine processes the authorization request and returns a binary answer indicating whether the authorization request is allowed or denied. The authorization engine makes the allow or deny decision based on a set of one or more policies. Each policy encompasses one or more statements in the policy language. The statements specify what actions are permitted and what actions are forbidden based on application data. For example, the application data could be groups to which a user belongs or attributes of a resource.

Turning now to FIG. 1, it illustrates authorization by a simple example. A provider network 100 includes an authorization engine 102 and a provider network application 104. The provider network 100 is connected to a remote electronic device 106 via an intermediate network 108. The intermediate network 108 is the Internet or other intermediate data communications network. In this example, the provider network application 104 is a photo sharing application. The example of a photo sharing application is used merely to illustrate concepts of authorization. Authorization and the policy language system and method are not limited to any particular provider network application.

The example photo sharing application provides features that one might expect of such an application. The features include the ability of users of the application to organize their photos into albums. The albums can be arranged hierarchically. For example, the "trips" album includes as descendant albums the "conference" album and the "vacation" album. The "art" album does not have any ancestor or descendant albums. In this example, a user "Jane" has uploaded two photos and organized the two photos into albums. Each of the photos is also tagged with a name of the photo. The "receipt.jpg" photo is additionally tagged as "private" and the "flower.jpg" photo is additionally tagged as "nature." The "receipt.jpg" photo is grouped into the "conference" album and the "flower.jpg" photo is grouped into both the "vacation" album and the "art" album.

The features of the photo sharing application also include the ability of users of the application to share their photos with other users of the application. The photo sharing application provides a group mechanism to facilitate photo sharing. In this example, Jane has created three groups: a "team" group, a "family" group, and a "friends" group. Like with albums, groups can also be arranged hierarchically. For example, the "family" group is configured as a descendant group of the "friends" group. Jane's configuration of groups, albums, and photos are part of the application data 110 of the provider network application 104. While in this example the application data 110 includes data about photos, photo albums, and photo sharing groups, the application data 110 will vary from provider network application to provider network application according to the particular provider network application 104 at hand. Thus, the application data 110 depicted in FIG. 1 is merely one example of possible application data.

Continuing the example of the photo sharing application, Jane has used the photo sharing application to allow anyone in Jane's "friends" group to view any photos in Jane's "trips" album. The photo sharing application has saved Jane's preferences as example authorization policy 112. Authorization policy 112 includes statements that express Jane's preferences in the policy language. In particular, in this example, authorization policy 112 allows all principals in Jane's "friends" group including all principals in any descendant groups (e.g., the "family" group) to view any resource in Jane's "trips" albums including any descendant albums (e.g., the "vacation" and "art" albums). In the example authorization policy 112 and in other examples herein, two-digit line numbers followed by a single colon character (':') are used for reference in this description. However, the line number designations may not appear in actual authorization policy data.

In addition to end user permissions, the developers of the photo sharing application may wish to configure a base or guardrail policy that applies to all users. For example, the developers may wish to prevent any user of the photo sharing application from performing any action on a resource that is tagged as "private" and that the user does not own. This policy is expressed by example authorization policy 114. Line 01 of authorization policy 114 is the effect of the policy which is forbid. In this example, the effect of the policy does not place any restriction on the principal, the action, or the resource. Thus, authorization policy 114 applies to all authorization requests from the provider network application 104. Lines 02-05 represent the condition of the policy 114. Authorization policy 114 can be read as forbidding any principal from performing any action on a resource that is tagged as private and where the resource is not in the principal's account.

Given authorization policy 112, authorization policy 114, and application data 110, the provider network application 104 can use the authorization engine 102 to answer authorization requests and decide what end user actions should be allowed and what end user actions should be denied. As a first example, at step "1", user "Alice" uses their remote electronic device 106 to make a request of the provider network application 104 to view Jane's photo named "flower.jpg." User "Alice" may make the request using a command line interface 116, a graphical user interface 118, or a software development kit 120 of remote electronic device 106. In any case, the request is sent from the remote electronic device 106 to the provider network application 104 via the intermediate network 108. For example, the request can be a HyperText Transfer Protocol (HTTP) request or similar. The request is depicted in FIG. 1 by the circle labeled "1".

In response to receiving Alice's request at step "1", the provider network application 104, at step "2", sends an authorization request 122 to the authorization engine 102. The authorization request 122 specifies user "Alice" as the principal, the action requested as "view," and the resource to be acted upon as the "flower.jpg" photo in Jane's albums. The authorization request 122 also specifies a request context which may include contextual information such as a network address of the remote electronic device 106 and a set of one or more key value pairs of an authentication session established for Alice. In this example, the authorization engine 102 will allow the authorization request 122 based on authorization policy 112 and authorization policy 114 because Alice is permitted to view the "flower.jpg" photo according to authorization policy 112 and Alice is not forbidden to perform that action on that resource by authorization policy 114. More specifically, Alice is in Jane's "friends" group, the action is "view," and the resource requested to be viewed is in Jane's "trips" album. Thus, the requested action is permitted by authorization policy 112. Authorization policy 114 does not forbid the requested action because the requested resource is not tagged as private. Because the authorization request 122 is allowed, the "flower.jpg" photo is returned at step 4.

Figure 2:
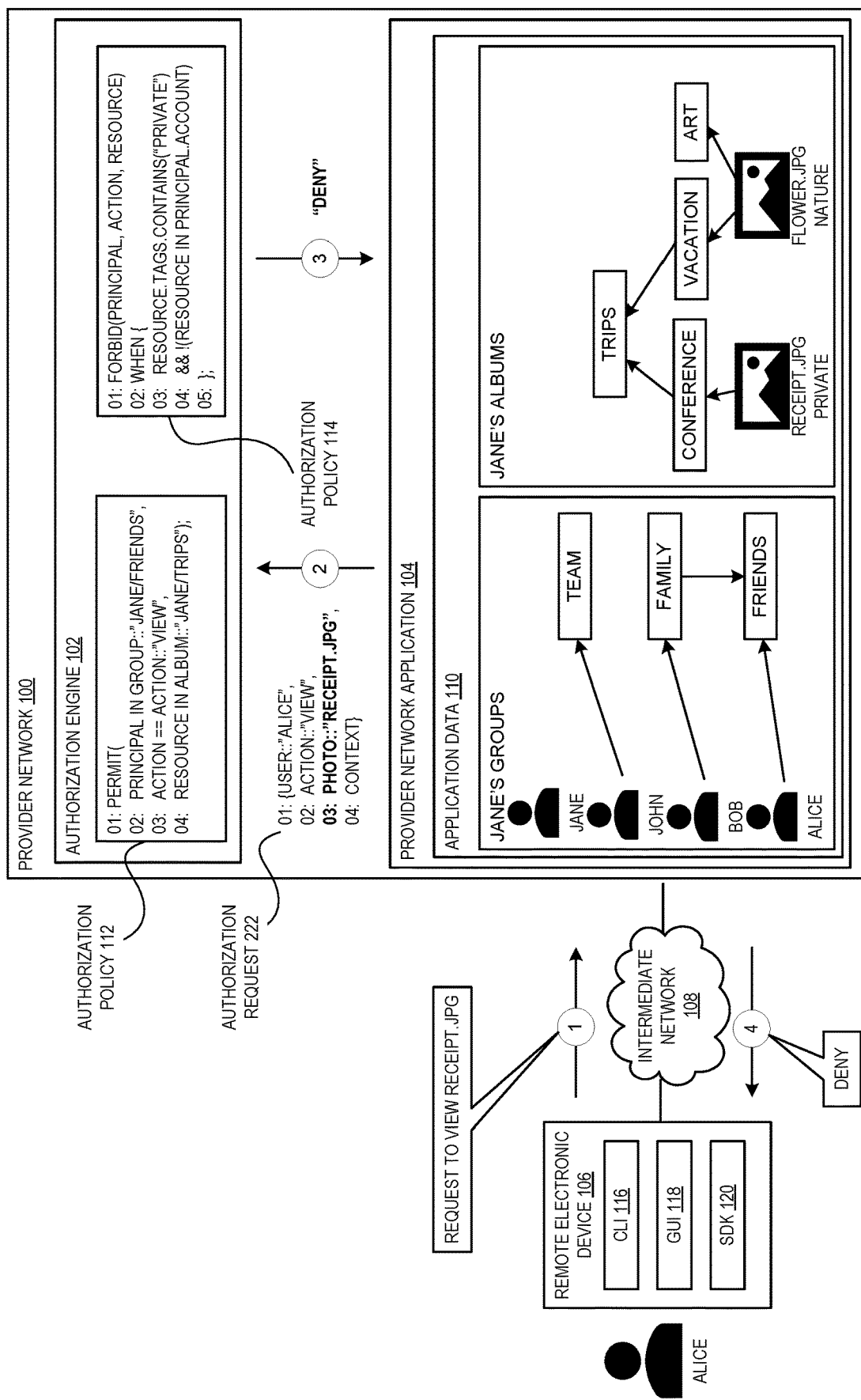
FIG. 2 illustrates an example authorization policy language system in a provider network.

FIG. 2 illustrates the situation where instead of requesting to view Jane's "flower.jpg" photo, Alice requests to view Jane's "receipt.jpg" photo. In this case, the authorization request 222 is denied by the authorization engine 102 because it is forbidden by authorization policy 114. Specifically, authorization policy 114 forbids the authorization request 222 because the "receipt.jpg" photo is tagged as "private", and the photo is in Jane's account, not Alice's. While authorization policy 112 permits the authorization request 222, the authorization engine 102 still denies the authorization request 222 because there is at least one authorization policy (i.e., policy 114) that forbids the authorization request 222. In other words, by default, a policy that forbids an authorization request overrides any policy that would permit the authorization request.

The policy language strikes a balance between expressiveness, performance, and analyzability. In particular, the policy language strikes a balance between being expressive enough to allow users to express most of the policies they want to express while at the same time the policy language is restrictive enough to provide good evaluation/runtime performance and analyzability. Analyzability refers to the ability of end-users to use static analysis tools to debug their own policies written in the policy language. For example, the policy language does not support loops as this would make it impractical to guarantee that evaluation of the policy would terminate and impractical to guarantee good evaluation/runtime performance. The policy language does support aggregate data types. Some examples of an aggregate data type include a list, a map, and a set. Nonetheless depending on which aggregate data types are supported by the policy language and which operators on those that aggregate data types are supported by the policy language, it can become impractical to provide precise analyzability of the policy language. The policy language supports certain aggregate data types and certain operators on those aggregate data types without sacrificing precise analyzability of policies written in the policy language.

In addition, the policy language is both fast and safe. Accordingly, the authorization engine that evaluates whether authorization requests should be allowed or denied based on policies written in the policy language is written in a programming language that emphasizes performance, type safety, and concurrency. In addition, the programming language supports memory safety without requiring use of a garbage collector or reference counting. Instead, the programming language enforces that all references point to valid memory. For example, to simultaneously enforce memory safety and prevent concurrent data races, the programming language could use a borrow checker that tracks the object lifetime and variable scope of all references in a program during compilation. For example, the programming language could be the Rust programming language which provides a good balance between safety and performance. However, a programming language other than Rust that is memory efficient, fast, and memory safe like Rust could be used.

A user authoring a policy in the policy language can still make mistakes translating their intent into the statements of the policy. For example, a user may author a policy or a set of policies that works most of the time but in certain corner cases is overly permissive which is a security issue. As another example, a user may author a policy or a set of policies that works most of the time but in certain corner cases is overly restrictive which is an availability issue. The techniques disclosed herein encompass a policy analysis tool that can reason about all possible requests of a policy and all possible states of a policy to detect such corner cases.

Existing policy languages either provide (a) great expressiveness at the cost of low performance and low analyzability or (b) high performance at the cost of low expressiveness. For example, an existing policy language provides high performance, but it is not expressive enough for many applications. This existing language allows for the specification of policies in terms of groups but not in terms of attributes of resources and principals. In contrast, the policy language of the present disclosure allows for the specification of policies in terms of both groups and attributes of resources and principles while at the same time still being performant. In other words, the policy language of the present disclosure provides an effective balance between expressiveness, performance, and analyzability that is not provided by existing policy languages.

The policy language facilitates authoring policies based on the application data of provider network applications. The application data of provider network applications varies from application to application. Specifically, the policy language facilitates authoring permissions based on group membership and attributes of application specific entities. For example, the authorization policy 112 and the authorization policy 114 in the example photo sharing application of FIGS. 1 and 2 are in terms of entities specific to the photo sharing application such as photos, albums, sharing groups, etc. These entities are specific to photo sharing and not necessarily involved in all provider network applications.

The policy language system and method also supports flexible record and aggregate data types found in common data exchange formats. Such common data exchange formats include JavaScript Object Notation (JSON), eXtensible Markup Language (XML), and the like. Returning to the photo sharing application, it may be desired to make authorization decisions based on JSON-formatted metadata of the photos uploaded to the application. The metadata may include location metadata indicating where in the world the photos were taken. The policy language system and method allows the photo sharing application to expose the location metadata as attributes of the uploaded photos for the purpose of authoring policies in terms of those attributes and photos. However, different photo capturing devices have different capabilities. Therefore, some of the photos uploaded to the photo sharing application may include location metadata and some might not. For example, location metadata may not be included in photos that are captured by devices that do not have global positioning satellite (GPS) capabilities. The policy language system and method allows the authorization of policies in terms of the location attribute of photos even if some photos do not have the location attribute and others do.

In some cases, end users of a provider network application will not author permission policies in the policy language. Instead, the permission policies will be automatically generated by the provider network application or authored by the developers of the provider network application. Nonetheless, in some cases depending upon the particular provider network application at hand, end users of a provider network application may author permission policies in the policy language directly. For example, in the case of the photo sharing application, a feature of a professional version of the photo sharing application may allow end users such as professional photographers to write complex Boolean permissions and conditions to secure their photos for the purpose of allowing their own clients to preview and potentially purchase photos. To support the situation where permission policies are exposed to the users of a provider network application, the policy language has a simple and intuitive syntax and semantics by which it is possible to author permission policies without having to study or read a language specification.

Policy Language Data Model and Semantics

The data model of the policy language system and method is centered on the notion of an entity. Entities are grouped into a hierarchy and entities have attributes. An entity may be viewed as a reference value, in other words, a name for an object. The name can take a particular format. For example, the name can include an entity type identifier and an identifier of an instance of the entity. The instance identifier is a globally unique identifier. Examples herein use simple type names and instance identifiers for the purpose of providing clear examples. However, in a practical implementation, entity type names and entity instance identifiers can be more complex. For example, an entity instance identifier can be a GUID which is a 128-bit text string that provides a unique reference value. Furthermore, entity type names and entity instance identifiers can be scoped to a namespace in which they are unique. For example, each provider network application may have its own namespace or set of namespaces. Thus, there is no requirement that entity type names or entity instance identifiers be probabilistically unique across all time and space.

Figure 3:
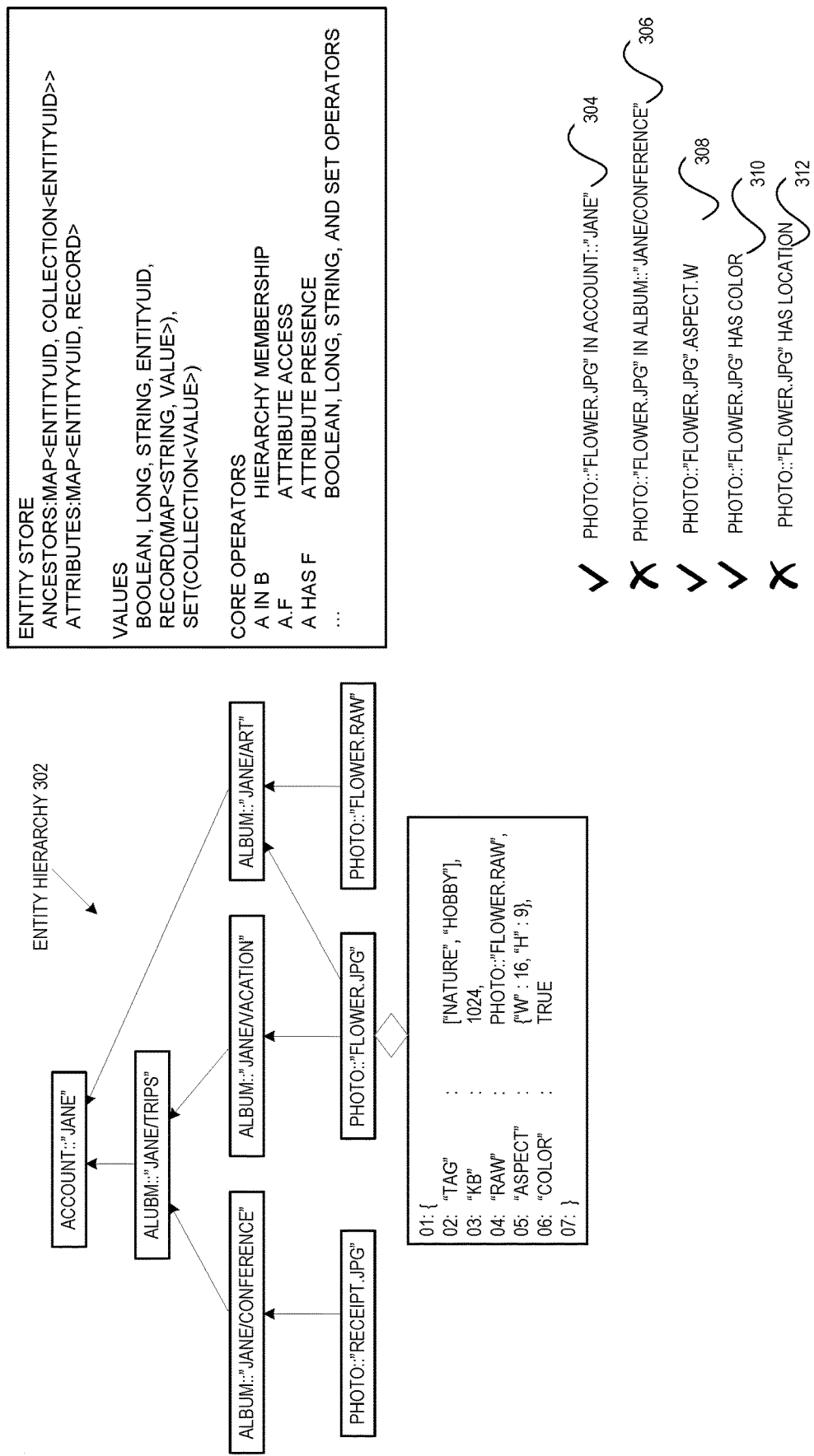
FIG. 3 illustrates example data model and semantics for an authorization policy language.

FIG. 3 illustrates an example entity hierarchy 302 for the example photo sharing application. Each node in the hierarchy 302 corresponds to an entity. For example, at the root of the hierarchy 302 is a node representing the entity that is Jane's account with the photo sharing application. The entity name for Jane's account includes the entity type identifier of "account" and an entity instance identifier of the string "Jane."

An entity hierarchy for a provider network application is represented by the policy language system and method as a directed acyclic graph or DAG. The DAG represents how the entities are grouped within the hierarchy. The entity hierarchy can be referenced by policies written in the policy language. To support traversal of the entity hierarchy in a policy, the policy language provides an IN operator. The IN operator can be used in a policy to test whether there is a path in the hierarchy between two nodes in the DAG. The policy statement A IN B where A and B are entities in the entity hierarchy tests whether entity A is a descendant of entity B in the DAG. For example, referring to example policy statement 304 that uses the IN operator, the evaluation of policy statement 304 by the authorization engine would return true because the Photo::"flower.jpg" entity is a descendant of the Account::"Jane" entity in entity hierarchy 302. In fact, there are multiple paths in entity hierarchy 302 from the Photo::"flower.jpg" entity to the Account::"Jane" entity. On the other hand, policy statement 306 would evaluate to false because there is no path in entity hierarchy 302 from the entity Photo::"flower.jpg" to the Album:: "Jane/Conference" entity.

Determining graph reachability can be an inefficient operation. The authorization engine of the policy language system and method uses an index to facilitate efficient evaluation policy statements that use the IN operator. This index is referred to herein as the entity store. For each entity in the entity hierarchy, the entity store durably stores a set of all entities in the hierarchy that are ancestors in the hierarchy of the given entity. This is referred to herein as the entity ancestor map. For example, an entry in the entity ancestor map can map the identifier of an entity to the set of entity identifiers for the entities in the hierarchy that are ancestors of the given entity. For example, an entry in the entity ancestor map for entity hierarchy 302 could map Photo:: "flower.jpg" to the set [Album::"Jane/Vacation", Album:: "Jane/Art", Album::"Jane/Trips", Account::"Jane" ]. By using the entity ancestor map, the authorization engine can evaluate a policy statement that uses the IN operator in constant time. For a policy statement A IN B that uses the IN operator the authorization engine can simply retrieve the entry in the entity ancestor map for entity A and test whether B is a member of the ancestor set of the entry. This is a constant time operation for the authorization engine.

An entity can have attributes. The collection of attributes of an entity is sometimes referred to herein as an attribute record of the entity or the entity's attribute record. An attribute record can be represented as a JSON object or the like. An attribute record is a map from string values to other values. The other values can be basic data types such as Boolean values, numeric values, string values, and entity identifiers. However, the other values can also be other records or sets of values. Because an attribute record can be represented as a JSON or like object, a provider network application can conveniently provide the attributes of an entity to the provider network system and method in the form of a JSON or like object. As JSON or like is a common way for provider network applications to represent their application data, this ability of the policy language system and method makes it easier for provider network applications to integrate with the policy language system and method.

The policy language supports other operators. For example, the policy language supports the dot ('.') operator.

The dot operator works uniformly across entities, attribute records, and nested attribute records. For example, example policy statement 308 references the value of the "aspect" attribute of the Photo::"flower.jpg" entity which is a nested record and in turn accesses the value of the "w" attribute of the nested record. Thus, the policy language supports authoring policy statements that dereference a chain of one or more entities, records, and nested records without worrying about whether it is an entity or a record that is being dereferenced by a given dot operator in the chain.

A dereferenced entity or record may or may not have a specified attribute. The authorization engine will return throw or raise an error at evaluation time if an entity or record does not have the specified attribute. The result of the error is that the authorization engine will treat the policy as being implicitly denied. The policy language provides a "has" operator. The has operator can be used in a policy statement to test at runtime whether a specified entity or record has a specified attribute before attempting to dereference the attribute using the dot operator. For example, policy statement 310 uses the has operator or predicate to test whether the Photo::"flower.jpg" entity has the "color" attribute. Add evaluation time, the authorization engine would evaluate policy statement 310 as true because the specified entity does have the specified attribute. On the other hand, the authorization engine would evaluate policy statement 312 as false because the Photo::"flower.jpg" entity does not have a "location" attribute.

To facilitate efficient evaluation by the authorization engine at evaluation time of policies authored in the policy language, the entity store may also store, in addition to the entity ancestor map, an entity attributes map. The entity attributes map maps entities to attribute records. For example, an entry in the entity attributes map can map and an identifier of an entity to a JSON or like object representing the record. At evaluation time, the authorization engine can retrieve from the entities attribute map the JSON or like object representing the record of an entity using an identifier of the entity. The authorization engine can then proceed to evaluate a policy based on the JSON object. The entities attribute map for an entity hierarchy facilitates a constant time lookup of the attributes record for a given entity in the entity hierarchy.

While the policy language supports sets as values in records, the policy language does not support lists. A list may be viewed as an ordered set of values. The reason for not supporting lists has to do with the analyzability of the policy language. In particular, a solution for encoding containment operators on lists such that a precise SMT analysis could be conducted was not found. Examples of containment operators on lists include A.contains(B) (is B an element of list A?), A.containsAll(B) (does list A contain all element of B?), and A.containsAny(B) (does list A contain any element of B?). However, precise SMT analysis is possible with sets. Roughly, the reason precise SMT analysis is possible with sets and not lists is because lists can contain duplicates and are sensitive to ordering, while sets are not. This is an example of how the policy language sacrifices some expressiveness but gains analyzability.

Policy Language

Figure 4:
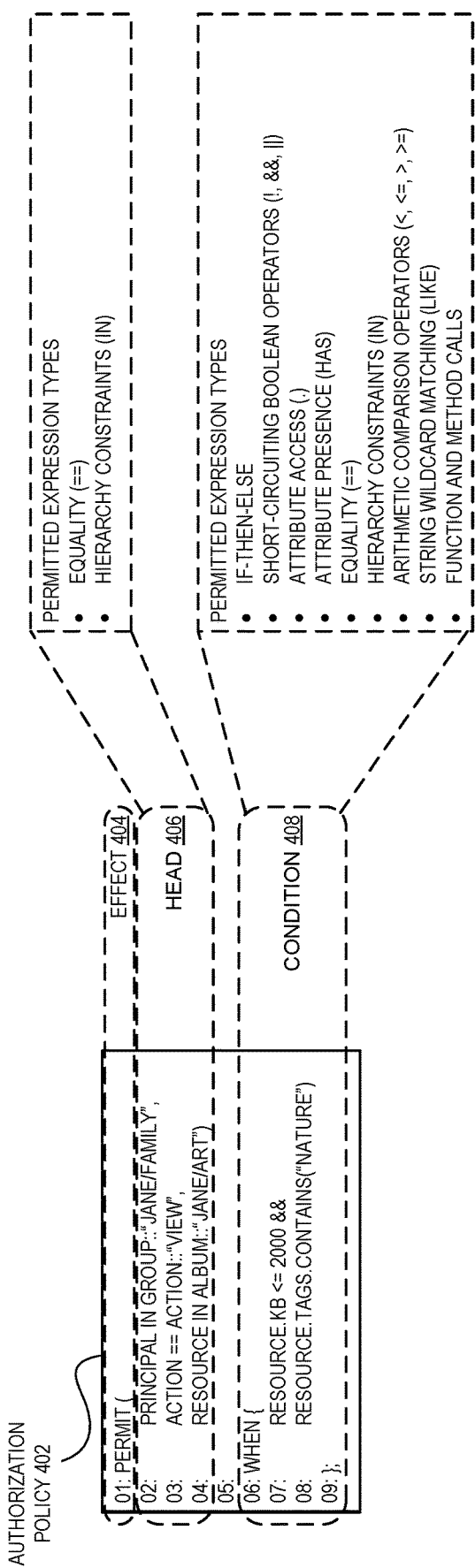
FIG. 4 illustrates example syntax of an authorization policy language.

FIG. 4 provides an example of a typical authorization policy authored in the policy language. The example policy 402 encompasses three parts referred to as the effect 404, the head 406 and the optional condition 408. The effect of authorization policy says what the effect of the policy is (e.g., permit or forbid). The head of an authorization policy specifies hierarchy constraints such as equality or the IN operator on the principal, the action, or the resource. The condition is optional and is a Boolean valued expression on the principal, the action, the resource, or the request context.

The head of a policy generally corresponds to a role-based access control (RBAC) rule. The condition of the policy generally corresponds to an attribute-based access control (ABAC) rule. The Boolean expression within the "when" clause of the condition can be essentially a pure functional subset of a language like Java or JavaScript. For example, the "when" clause can contain any or all of: if-then-else expressions, short circuiting Boolean operators, attribute access (.), attribute presence (has), equality (==), hierarchy constraints (in), arithmetic comparison operators (<, <=, >, >=), string wild card matching (like), or function and method calls. For purposes of performance and analyzability, the policy language does not support loops, parameterized iterations, or side effects (mutations) within the "when" clause of the condition.

The head of a policy can test for equality (==) or hierarchical containment (in). The policy language limits the head of a policy to just these two types of expressions. These two types of expressions are also allowed in the condition of a policy in addition to the other types of expressions listed in FIG. 4.

With the types of expressions permitted in the head of a policy being a subset of the types of expressions permitted in the condition of a policy, it is possible for a policy to combine the head and the condition into one syntactic construct. An example of policy 402 where the head 406 and the condition 408 are combined is provided by example policy 502 of FIG. 5. However, the policy language syntactically and semantically distinguishes between the head and the condition for readability. In particular, a reader of the policy 402 can quickly discern whether the policy 402 is a pure role-based access control policy, a pure attribute-based access control policy, or a mix of a role-based access control policy and an attribute-based access control policy. Specifically, a pure role-based access control policy contains just a head and no condition. A pure attribute-based access control policy contains a condition but with a head that has no constraints on membership. A policy that is a mix of a role-based access control policy and an attribute-based access control policy such as, for example, policy 402, contains a head with constraints on membership and a condition. In contrast, with the combined policy 502 of FIG. 5 a reader cannot as quickly discern compared to policy 402 which expressions are role-based access control expressions and which are attribute-based access control expression because combined policy 502 syntactically commingles role-based access control expressions with attribute-based access control expressions and policy 402 syntactically separates role-based access control permissions from attribute-based access control permissions.

Another reason the policy language separates the head from the condition is performance. The separation facilitates slicing. Slicing is the ability of the authorization engine to determine whether an authorization request should be allowed or denied by evaluating only a subset of the entities, attributes, or policies that apply to the authorization request. The entity store for a provider network application can be huge. There can be millions or even billions of entities, attributes, and policies. Therefore, evaluation performance of policies by the authorization engine is critical. For example, it may not be possible to load all the entities, attributes, and policies applicable to an authorization request into memory at the same time.

Figure 6:
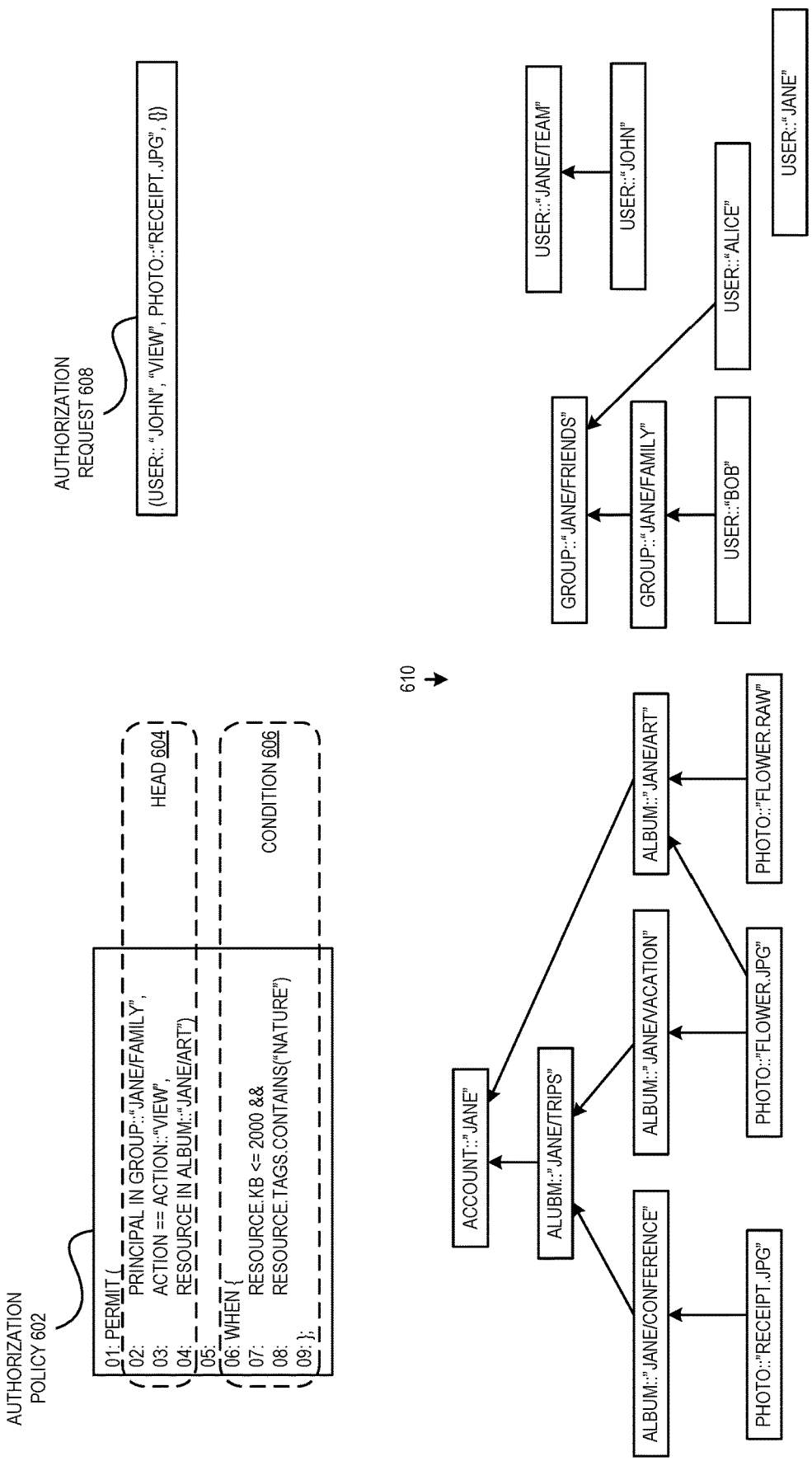
FIG. 6 illustrates example syntax of an authorization policy language.

The authorization engine can prune a policy from evaluation against an authorization request based on the head of the policy. In particular, where the head of the policy places a hierarchical constraint on the request principal or the request resource, then the authorization policy can be pruned from evaluation if the principal of the policy is not an ancestor of the request principal in the entity hierarchy or if the resource of the policy is not an ancestor of the request resource in the entity hierarchy. Consider the example of FIG. 6. It depicts an example authorization policy 602 with an example head 604 and an example condition 606 along with an example authorization request 608 and an example entity hierarchy 610. The authorization engine need not evaluate policy 602 against authorization request 608 if the entity Group::"Jane/Family" is not an ancestor of the entity User::"John" in the entity hierarchy 610 or if the entity Album::"Jane/Art" is not an ancestor of the entity Photo:: "receipt.jpg" in the entity hierarchy 610. Recall that the entity store contains an entity ancestor map which enables efficient, constant time determination of whether an entity is an ancestor of another entity in an entity hierarchy. Thus, the authorization engine can use the head of a policy to efficiently determine whether the policy needs to be evaluated against an authorization request.

Authorization Engine

Figure 7:
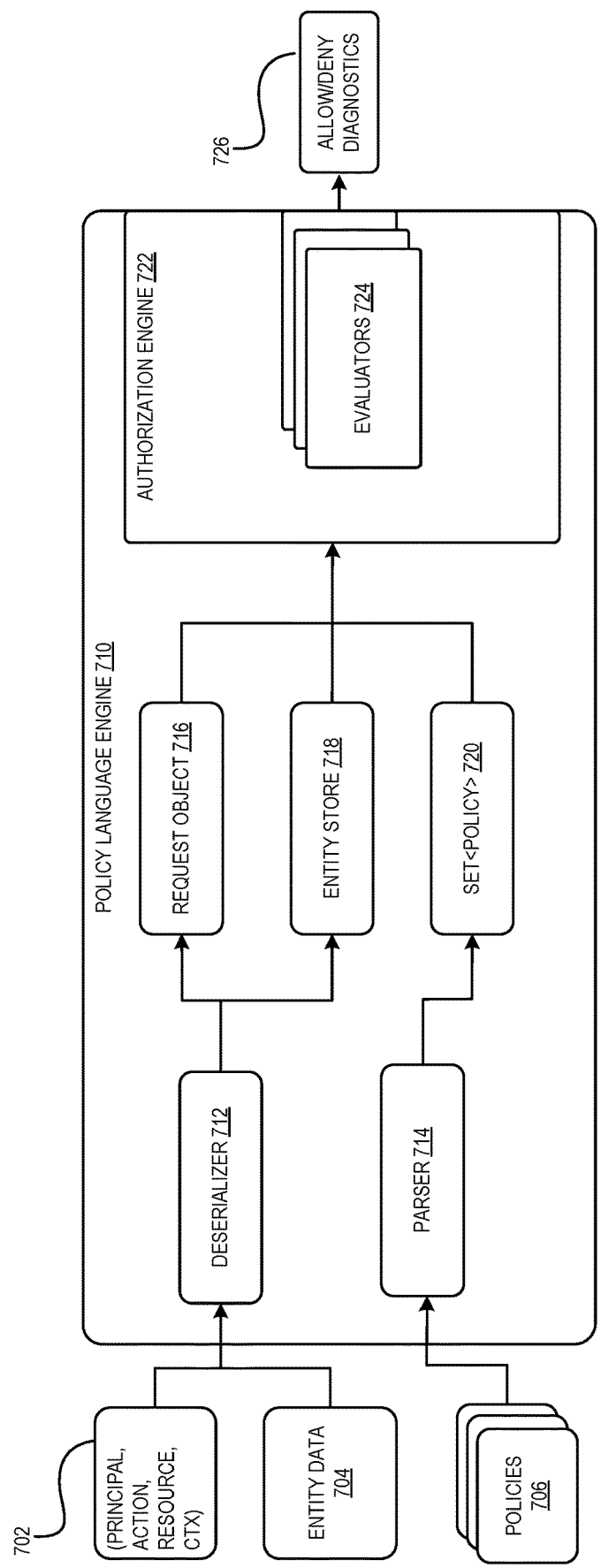
FIG. 7 illustrates an example authorization engine in a provider network.

FIG. 7 illustrates a policy language engine 710 in the context of provider network 700. The policy language engine 710 includes a deserializer 712, a parser 714, and an authorization engine 722. A provider network application (e.g., application 104) provides entity data 704 to the policy language engine 710. The entity data 704 represents the application data (e.g., application data 110) of the provider network application that the developer of the provider network application wishes to base their access control policies on. The entity data 704 can be provided in a convenient serialized form such as, for example, in JSON or like format. The deserializer 712 deserializes the entity data 704 and constructs an entity ancestor map and an entity attributes map in the entity store 718 based on the deserialized form of the entity data 704. The constructed entity ancestor map and the entity attributes map index the entities and attributes thereof in the entity data 704 in the entity store 718.

At runtime of the provider network application, the provider network application sends an authorization request 702 to the policy language engine 710. The authorization request 702 can be received by the policy language engine 710 in a convenient serialized format such as, for example, in JSON format. The authorization request 702 specifies a principal, an action, a resource, and a request context. The deserializer 712 deserializes the authorization request 702 to convert it into a deserialized form represented in FIG. 7 as request object 716.

The authorization engine 722 evaluates each policy in a set of one or more policies 706 against the authorization request and using the entity store 718. For example, the set of policies 706 may be a subset of a larger set of policies of which some policies are pruned from the larger set by the authorization engine 722 as not applicable to the authorization request 702.

A parser 714 may parse the set of policies 706 to convert them into a more efficient form for evaluation represented in FIG. 7 as a set of policy objects 720. The authorization engine 722 has one or more evaluator components (evaluator(s) 724). Multiple evaluators may be used for parallelism in policy evaluation. The authorization engine 722 is responsible for making an allow or deny decision based on the evaluation of the set of policies 706 by the evaluator(s) 724. Each policy in the set of policies 706 is evaluated by an evaluator. Evaluation of a policy by an evaluator returns either true or false. If the policy is satisfied, the evaluator returns true. Otherwise, the evaluator returns false. The authorization engine 722 combines the individual true/false results from the evaluator(s) 724 into an allow or deny decision. By default, and according to the principle of least privilege, the authorization engine 722 denies the authorization request 702. The authorization engine 722 allows the authorization request 702 if and only if at least one permit policy in the set of policies 706 evaluates to true and no forbid policy in the set of policies 706 evaluates to true. Otherwise, the authorization engine 722 returns deny.

The policy language engine 710 returns one of two answers to the requesting provider network application as a response to the authorization request 702. The answer 726 returned is the result of evaluating the set of policies 706 against the authorization request 702 using the entity hierarchy data (e.g., an entity ancestor map and an entity attributes map) in the entity store 718. One possible answer 726 is that the authorization request 702 is allowed. Another possible answer 726 is that the authorization request 702 is denied. The response 726 also includes diagnostic information. The diagnostic information identifies the policy or policies of the set of policies 706 that caused the answer 726 to be allowed or denied. This diagnostic information may be useful to the provider network application to explain to an end user of the application (e.g., in a graphical user interface) why their request of the application failed or was denied or useful for other purposes such as debugging.

The authorization engine 722 can deny the authorization request 702 if any policy of the set of policies 706 against which the authorization request 702 is evaluated evaluates to false. Only if all policies of the set of policies 706 against which the authorization request 702 is evaluated evaluate to true then does the authorization engine 722 allow the authorization request 702. The authorization engine 722 can also deny an authorization request 702 if any policy encounters an error in its evaluation against the authorization request 702. The result of an evaluation of a policy in the set of policies 706 against the authorization request 702 can be true, false, or an error. Recall from above that some policies for a provider network application may not be evaluated against an authorization request if they can be pruned from evaluation. Pruned policies are not evaluated against the authorization request 702.

To ensure that the authorization engine 722 can efficiently evaluate policies, the authorization engine 722 can be implemented in a safe but performant programming language. For example, the authorization engine 722 can be implemented in the RUST programming language or other like programming language. RUST is a high-level programming language but with the performance of a low-level programming language like C or C++. In one implementation, an authorization engine implemented in RUST is able to evaluate a typical authorization request involving hundreds of policies, thousands of entities, and even more attributes in less than one millisecond.

Another benefit of implementing the authorization engine 722 in RUST is that its memory management facilities are extremely efficient. RUST does not use a runtime garbage collector which can consume limited computing resources used to evaluate policies against authorization requests. Nonetheless RUST provides memory safety in the form of its type system which is a theorem prover. During compilation, the RUST compiler attempts to prove that the program being compiled (e.g., the RUST programming language instructions for the authorization engine 722) does not contain memory leaks or dangling references. The program won't compile if the theorem can't be proved. RUST also provides bindings to other programming languages such as JAVA for the purpose of building extension or plugins of the authorization engine 722 in different programming languages.

The authorization engine 722 can evaluate the set of policies 706 at least partially in parallel. To do this, the authorization engine 722 uses a set of evaluators 724. Each evaluator in the set of evaluators 724 can be a separate process, thread, or the like that executes in at least partially in parallel with one or more other evaluators on a separate CPU core CPU or computing device, for example. The set of evaluators 724 can be greater than equal to or less than the number of policies in the set of policies 706 to be evaluated. The set of evaluators 724 can execute as part of a framework for processing parallelizable problems across a cluster of computing nodes such as, for example, a MapReduce framework or the like. For example, the set of evaluators 724 can execute as a set of mapping operations in a MapReduce framework. The number of evaluators 724 can correspond to the number of available computing nodes in the cluster available to execute evaluators at least partially in parallel. Each computing node can be a separate CPU core, CPU, or computing device, for example.

Each evaluator in the set of evaluators 724 evaluates one policy in the set of policies 706 at a time at least partially in parallel with the other evaluators and over time can execute multiple policies in the set of policies 706. Because each policy in the set of policies 706 can be evaluated independently of the other policies and because policies are evaluated at least partially in parallel, the authorization engine 722 can stop evaluating the set of policies 706 against the authorization request 702 once any policy in the set of policies 706 evaluates to false or error. When an early stop decision is made by the authorization engine 722, a response 726 can be returned to the provider network application immediately without having to evaluate any remaining policies in the set of policies 706 that have yet to be evaluated against the authorization request 702. This early stopping of policy evaluation conserves limited computing resources of the authorization engine 722.

The separation of the head and the condition in policies facilitates early stopping. Specifically, if the head of a forbid policy that does not have a condition evaluates to true, then evaluation of the set of policies 706 can stop early. If a forbid policy also has a condition, then the condition is evaluated as well. If both the head and the condition of the forbid policy evaluate to true, then evaluation of the set of polices 806 can stop early. This early stopping conserves limited computing resources of the authorization engine 722. Thus, when a forbid policy is evaluated by the set of evaluators 724, the head of the forbid policy can be evaluated first. If evaluation of the head of the forbid policy is false, then any condition of the forbid policy need not be evaluated, the policy does not deny the request 702, and evaluation can proceed with any remaining policies in the set of policies 706. Only if the evaluation of the head of the forbid policy is true, is any condition of the forbid policy evaluated. If evaluation of the head of the forbid policy is true but evaluation of the condition of the forbid policy is false, then the policy does not deny the request 702 and evaluation can proceed with any remaining policies in the set of policies 706. Where the set of policies 706 includes at least one forbid policy, evaluation of forbid policies can be prioritized over evaluation of permit policies so that permit policies are not needlessly evaluated when a forbid policy would result in the authorization request 702 being denied.

Operations on Entities

Entities are reference values in the policy language. The policy language supports three operations on entities: equality, reachability, and attribute retrieval. In particular, if A, B, and C, are entity identifiers, then equality is expressed in the policy language as A==B, reachability is expressed in the policy language as A in B or A in [B, C, . . . ], and attribute retrieval is expressed in the policy language as A.f where f is an attribute.

Equality A==B holds if and only if A and B are the same entity identifier. So, User::"Alice"==User::"Alice" holds but User:"John"==User::"Alice" does not. It makes no difference whether different entity identifiers happen to refer to objects having the same attributes; they are still deemed unequal. Equality holds even when an entity identifier does not actually reference an entity object in the entity hierarchy. Thus, User:: "Alice"==User:: "Alice" holds regardless of whether User:: "Alice" is a dangling reference or not.

Reachability A in B holds if and only if either A is equal to B, or A is a descendant of B in the entity hierarchy. The expression A in [B, C, . . . ] is equivalent to A in B ∥ A in C ∥ . . . but will yield an error if any element in the set is not an entity reference. A in B will return false if A and/or B do not exist in the entity hierarchy, except for the special case of A in A which returns true even if A does not exist.

Policies can retrieve the value of an entity's attribute using the dot operator; e.g., A.account retrieves the entity value that references the account object that belongs to the entity A. If A does not reference an entity in the hierarchy, or the referenced entity does not have an account attribute, an error is raised. Entity attributes can also be accessed with the [ ] operator, which takes a string literal representation of the attribute; so, A.account is equivalent to A["account"].

Namespaces

Entities may be referenced in a policy using namespaces. For example, PhotoApp::Groups::Album:: "vacation" is an example entity identifier where the entity type is PhotoApp::Groups::Album; which is to say that it is the type Album defined in namespace PhotoApp::Groups.

Primitive and Aggregate Values

In addition to entities, the policy language data model includes primitive and aggregate values. These values can be stored in entities' attributes in the entity store. These values can also be a part of the request context information of an authorization request from a provider network application.

Primitive data types supported by the policy language include the following four data types:
 (1) Booleans (e.g., true and false),
 (2) Numbers (e.g., 64-bit signed integers).
 (3) Strings, and
 (4) Network addresses and ranges (e.g., IPv4 or IPv6 addresses and ranges).

Aggregate data types supported by the policy language include the following two data types:
 (1) Sets. A set may contain element of different dynamic types. A set can be constructed in a policy using the [ ] syntax. Some examples of a set include: [2, 4, "hello" ], [−1], [ ], { }, {3<5, ["nested", "set" ], true}; and (2) Anonymous records. Record attributes are valid identifiers or (arbitrary) strings, and values may be heterogeneous (the same record may contain values of different dynamic types). Records can be constructed with { } syntax (examples: {"key": "value" }, {id: "value" }, {"key": "value", id: "value" }, { }, {"foo": 2, bar: [3, 4, −47], ham: "eggs", "hello": true}). Record attribute values are accessed just as entity attributes are, using the [ ] indexing operator and a string literal, e.g., record["key" ], or the dot ('.') operator, e.g., record.foo. Nested record access is similar, e.g., context.some.nested.attribute or context["some" ].nested["attribute" ].

Policy language values (that is, entities, primitive values, and aggregate values) are compared for equality in the usual way. Two sets s1 and s2 are equal, ==, if they contain exactly the same elements, regardless of order. Two records are equal if they consist of the same set of key-value pairs. Values of different types are never equal—in particular, an entity is never equal to a record (even if the record happens to contain the same keys/values as the entity's attributes).

In addition to equality, policy language values can be used with the small set of operators and functions listed in the table below. These include relational operators, and operations on strings, sets, and records. The && and || operators perform short-circuiting. For example, false && . . . will evaluate to false without evaluating . . . and likewise true || . . . will evaluate to true without doing so. This is true even when the . . . has type errors, e.g., true || "a"<3 evaluates to true. The policy language could support other operators, such as arithmetic ones, according to the requirements of the particular implementation at hand.

Table 1 below lists built-in operators and functions of the policy language. The table lists the available overloads for each operator. In addition to the operators and functions in the table, the policy language also supports if-then-else ternary expressions with the syntax: if expr1 then expr2 else expr 3. The condition expr1 must evaluate to a Boolean.

| BUILT-IN OPERATORS AND FUNCTIONS | | |
|---|---|---|
| SYMBOL | TYPES AND OVERLOADS | DESCRIPTION |
| ! | bool → bool | logical not |
| == | any → any | equality. Works on arguments of any type, even if the types don't match. (Values of different types are never equal to each other.) |
| != | any → any | inequality; the exact inverse of equality (see above) |
| < | (long, long) → bool | long integer less-than |
| <= | (long, long) → bool | long integer less-than-or-equal-to |
| > | (long, long) → bool | long integer greater-than |
| >= | (long, long) → bool | long integer greater-than-or-equal-to |
| in | (entity, entity) → bool | Hierarchy membership (reflexive: A in A is always true) |
| in | (entity, set(entity)) → bool | Hierarchy membership: A in [B, C, . . .] is true iff (A in B) || (A in C) || . . . error if the set contains a non-entity |
| && | (bool, bool) → bool | Logical and (short-circuiting) |
| || | (bool, bool) → bool | Logical or (short-circuiting) |
| has | (entity, attribute) → bool | infix operator. e has f tests if the record or entity e has a binding for the attribute f. returns false if e does not exist or if e does exist but doesn't have the attribute f. Attributes can be expressed as identifiers or string literals. |
| like | (string, string) → bool | infix operator. t like p checks if the text t matches the pattern p, which may include wildcard characters * that match 0 or more of any character. In order to match a literal star character in t, users can use the special escaped character sequence \* in p. |
| .contains( ) | (set, any) → bool | Set membership (is B an element of A) |
| .containsAll( ) | (set, set) → bool | Tests if set A contains all of the elements in set B |
| .containsAny( ) | (set, set) → bool | Tests if set A contains any of the elements in set B |

Types

The policy language is dynamically typed, like JAVASCRIPT or PYTHON. As mentioned above, this means that a policy can contain an expression like [3, 4, −47]=="hello" and the authorization engine will accept them without return or raising an error (here, evaluating to false). Similarly, to many other dynamically typed languages, the policy language is type safe, that is, the type of every value is known at runtime, and the operators and functions check that their arguments have the expected types, resulting in runtime errors if those expectations are violated.

Policy Syntax

Policy language polices are written using the grammar in the table below. A policy consists of three elements:
  (1) The effect the policy has on authorization, which is either permit or forbid (nonterminal Effect in the grammar);
  (2) The policy head, which constrains which principal, action, and resource the policy applies to (nonterminal Head in the grammar); and
  (3) The conditional clauses, which further refine the circumstances under which the policy applies (nonterminal Conds in the grammar).

Roughly speaking, the policy head describes a role-based access control (RBAC)-style policy, while the conditional clauses refine it to express an attribute-based access control (ABAC) policy. The effect and policy head are mandatory, but the conditional clauses are optional.

The following grammar specification for the policy language uses I for alternatives, [ ] for optional productions, ( ) for grouping, and { } for repetition of a form zero or more times. Capitalized words stand for grammar productions, and lexical tokens are given in all-caps. Tokens are defined using regular expression, where [ ] stands for character ranges; | stands for alternation; *, +, and ? stand for zero or more, one or more, and zero or one occurrences, respectively. ~stands for complement; and—stands for difference. The grammar ignores whitespace and comments.

POLICY GRAMMAR

```
Policies := {Policy}
Policy := Effect '(' Head ')' {Conds} ';'
Effect := 'permit' | 'forbid'
Head := Principal ',' Action ',' Resource
Principal := 'principal' [('in' | '==') (Entity | '?principal')]
Action := 'action' [('in' '[' EntList ']' | '==' Entity)]
Resource := 'resource' [('in' | '==') (Entity | '?resource')]
Conds := ('when' | 'unless') '{' Expr '}'
Expr := Or | 'if' Expr 'then' Expr 'else' Expr
Or := And {'||' And}
And := Relation {'&&' Relation}
Relation := Unary [RELOP Unary]
  | Unary 'has' (IDENT | STR)
  | Unary 'like' PAT
Unary := ['!']x4 Member
Member := Primary {Access}
Access := '.' IDENT ['(' [ExprList] ')'] | '[' STR ']'
Primary := LITERAL
  | VAR
  | Entity
  | ExtFun '(' [ExprList] ')'
  | '(' Expr ')'
  | '[' [ExprList] ']'
  | '{' [RecInits] '}'
Path := IDENT {'::' IDENT}
Entity := Path '::' STR
EntList := Entity {',' Entity}
ExprList := Expr {',' Expr}
ExtFun := [Path '::'] IDENT
RecInits := (IDENT | STR) ':' Expr {',' (IDENT | STR) ':' Expr}
RELOP := '<' | '<=' | '>=' | '>' | '!=' | '==' | 'in'
IDENT := ['_''a'-'z''A'-'Z']['_''a'-'z''A'-'Z''0'-'9']* - RESERVED
STR := Fully-escaped Unicode surrounded by ""s
PAT := STR with '\*' allowed as an escape
LITERAL := BOOL | INT | STR
BOOL := 'true' | 'false'
INT := '-'? ['0'-'9']+
RESERVED := BOOL | 'if' | 'then' | 'else' | 'in' | 'like' | 'has'
VAR := 'principal' | 'action' | 'resource' | 'context'
WHITESPC := Unicode whitespace
COMMENT := '//' ~NEWLINE* NEWLINE
```

Inline Policies

The policy language supports at least two kinds of policies:

(1) inline policies; and
(2) policy templates.

The following examples focus on inline policies but are also applicable to policy templates. A distinguishing feature of an inline policy from a policy template is the use of the syntax ?principal or ?resource as parameters in the policy head.

The following example inline policy c1 for the photo sharing application permits Jane's friends to view or comment on all photos that are transitively contained in her trips album (i.e., in the album or any nested sub-albums):

01: permit(principal in Group::"jane_friends",
02: action in [Action::"view", Action::"comment" ],
03: resource in Album::"jane_trips");

The following example inline policy c2 forbids any user other than the owner of a photo sharing application account from performing any action on resources tagged as "private":

01: forbid(principal, action, resource)
02: when {resource.tags.contains("private")}
03: unless {resource in principal.account};

A policy begins with either the permit or the forbid keyword. A permit policy grants access, while a forbid policy restricts access by overriding a permit policy. The above examples are examples of both kinds of policies.

A policy contains the keyword variables principal, action, and resource, possibly including constraints. The constraints determine which principals, actions, and resources the policy applies to, according to the underlying entity hierarchy. The hierarchy constraints for principal and resource take one of two forms: var or var ('in' | '==') Entity (an additional form, for policy templates, is discussed below). The action constraint can take either of those forms, or a third form var in [Entity, Entity, . . . ]. These are RBAC-style constraints; the policy c1 uses these RBAC-style constraints, while c2 uses ABAC-style constraints (via when and unless clauses) to express constraints on which principals and resources the policy applies to.

An RBAC-style equality constraint, var==Entity, says that the policy applies only when var is equal to Entity (meaning that the policy applies only to one specific entity, Entity). An RBAC-style membership constraint, var in Entity, says that the policy applies only when var is a descendant of Entity in the entity hierarchy. The IN operator is reflexive, so any entity is implicitly a descendant of itself. For example, the constraint resource in Album::"jane_trips" in the policy c1 means that the policy applies only to resources that are transitively contained in Jane's "trips" album, including the album itself. Finally, the RBAC-style set form, var in [Entity, Entity, . . . ] (which is only allowed for action) says that var is either equal to or descendant of one (or more) of the entities specified in the set. If just var, that imposes no constraints. For instance, in policy c2, forbid(principal, action, resource) imposes no constraints on the principal, action, or resource, and thus the policy applies to all principals, actions, and resources in the system, subject to any when and unless clauses, if present.

Conditional clauses start with when or unless, and are Boolean expressions over the input variables. The policy only applies if all when clauses evaluate to true and all unless clauses evaluate to false. Conditional clauses are written in the policy language, defined by the non-terminal Expr in the grammar. The constraints on principal, action, and resource in the head can be viewed as expressions as they are also described by the Expr grammar.

The policy language is a relatively simple language in order to minimize ambiguities in the grammar. The policy language has some desirable properties: expressions have no side effects; expression (and policy) evaluation is guaranteed to terminate; and the worst-case running time of each policy is bounded to be quadratic in policy and input size, but usually linear.

The policy language supports relational and logical binary operators (e.g., x<5 and !(x && y)). Expressions may contain conditionals if E1 then E2 else E3 (like E1 ? E2: E3 in C). Expressions may also contain in expressions like A in B or A in [B, C, . . . ], as discussed earlier. Given a policy in a serialized format (e.g., JSON), the policy language engine parses it to produce an abstract policy tuple, c=<Effect, Principal, Action, Resource, Conds>. The elements of a policy tuple correspond to the grammar productions.

The following three functions are defined on policy tuples c:

(1) Effect(c): {Allow, Deny};
(2) Principal(c), Action(c), Resource(c): Expr;
(3) Conds(c): List<Expr>

The function Effect(c) returns the value Allow for permit policies and Deny for forbid policies. The function Conds(c) returns the list of Expr clauses for c, which may be empty. These clauses come from when or unless clauses in the policy; when clauses are individual expressions, and unless clauses are negated expressions. The Principal(c), Action(c), and Resource(c) functions return the expanded constraint expressions on the input variables principal, action, and resource; if there is no constraint expression, they simply return true.

For example, parsing of the example policy c1 above yields:

(1) Effect(c1)=Allow
(2) Principal(c1)=principal in Group::"jane_friends"
(3) Action(c1)=action in [Action::"view", Action::"comment"]
(4) Resource(c1)=resource in Album::"jane_trips"
(5) Conds(c1)=[ ]

As another example, parsing of the example policy c2 above yields:

(1) Effect(c2)=Deny
(2) Principal(c2)=true
(3) Action(c2)=true
(4) Resource(c2)=true
(5) Conds(c2)=[resource.tags.contains("private"), !(resource in principal.account)]

It should be noted that Conds(c1) is empty, since c1 has no when or unless clauses, but Conds(c2) is a list of two, where c2's when clause appears unchanged, and its unless clause is negated.

Policy Templates

Policy templates allow for creating policies programmatically in a safe and convenient way. A policy template has one or more slots. Two slots are, ?principal and ?resource. A slot may only appear in the policy head constraint for its variable, and may only appear on the right-hand side of ==or IN operator.

The following policy is a template with slots for both ?principal and ?resource:

```
01:    permit(
02:        principal == ?principal,
03:        action in [Action::"view", Action::"comment"],
04:        resource in ?resource
05:    )
06:    unless {
07:        resource.tag =="private"
08:    };
```

A policy template is not evaluated by the authorization engine as part of an authorization request directly. It is first instantiated by providing entity identifiers as arguments for the slots. The number of arguments must match the number of slots in the policy template. A policy against which an authorization request is evaluated can be an inline policy or an instantiated policy template.

For example, instantiating the above policy template with [{"Principal": "User::\"bob\"", "Resource": "Photo::\"trip\""}, {"Principal": "User::\"cat\"", "Resource":"Doc::\"sales\""}] will yield policy instances equivalent to the following two inline policies.

First equivalent inline policy:

```
01:    permit(
02:        principal == User::"bob",
03:        action in [Action::"view", Action::"comment"],
04:        resource in Photo::"trip"
05:    ) unless {
06:        resource.tag == "private"
07:    };
```

Second equivalent inline policy:

```
01:    permit(
02:        principal == User::"cat",
03:        action in [Action::"view", Action::"comment"],
04:        resource in Doc::"sales"
05:    ) unless {
06:        resource.tag == "private"
07:    };
```

Policy Semantics

Inline policies and policy instances have the same semantics. A policy c may refer to an inline policy or a policy instance. An authorization request (equivalently an "authorization query") is defined as the tuple <P, A, R, X> where P is a principal, A is an action, R is a resource, and X is the request context. P, A, and R are entity identifiers, while X is a record. The authorization engine grants the request—that principal P is allowed to perform the action A on the resource R in circumstances described by the context X—if that request is satisfied by the authorization relation for a given provider network application, defined by that application's policy set. The authorization relation satisfies the request <P, A, R, X> if and only if it satisfies at least one permission (permit) policy and no restriction (forbid) policies. We define what it means for a request to satisfy a policy as follows.

A request <P, A, R, X> satisfies a policy c when evaluating c on the request produces the value true. More precisely, every policy c denotes a function [[c]] from entity hierarchies H and queries <P, A, R, X> to Booleans. The request <P, A, R, X> satisfies c with respect to the hierarchy H when (<[[c]](h) P, A, R, X>) is true.

The function [[c]] is defined by evaluating the policy c with respect to entity hierarchy H and the request <P, A, R, X>; the variables principal, action, resource, and context that appear in c bound to the values P, A, R, and X, respectively. The result of the evaluation is true if Principal (c), Action(c), and Resource(c) all evaluate to true; every when expression in Conds(c) evaluates to true; and every unless expression in Conds(c) evaluates to false.

Policies are total functions, which means that they return true or false for every input. In particular, a policy returns false if its evaluation would error under the standard expression semantics, e.g., because the policy attempts to access an attribute that does not exist for a given entity.

Another way to view evaluation of a policy c is that from c we can construct the policy language expression e which has the form Principal(c) && Action(c) && Resource(c) && {x|x in Conds(c)}. Then the authorization engine evaluates this expression e for a particular request <P, A, R, X> and entity hierarchy H, resulting in either true or false.

For example, example policy c1 above corresponds to the expression: principal in Group::"jane_friends" && action in

[Action::"view", Action::"comment" ] && resource in Album::"jane_trips". There are no conditional clauses in this policy.

As another example, example policy c2 above corresponds to the expression: true && true && true && resource.tags.contains("private") && !(resource in principal.account). There are no head constraints in this policy, so each is represented by true in the expression form.

In addition to computing an authorization decision (Allow or Deny), the authorization engine also compute the reasons that accompany the decision. Specifically, the authorization output is a triple, encompassing a decision a set of reasons, and a set of errors. The output is correct if it satisfies the authorization semantics definition 800 of FIG. 8. According to definition 800, if dec is Allow, then reason includes the policy IDs for all satisfied permissions. Otherwise, dec must be Deny, and reason includes the policy IDs for all satisfied restrictions. Error includes the evaluation error messages. The semantics are deterministic: it is a function of P, A, R, X, the entity hierarchy H, and the application's policies.

Figure 9:
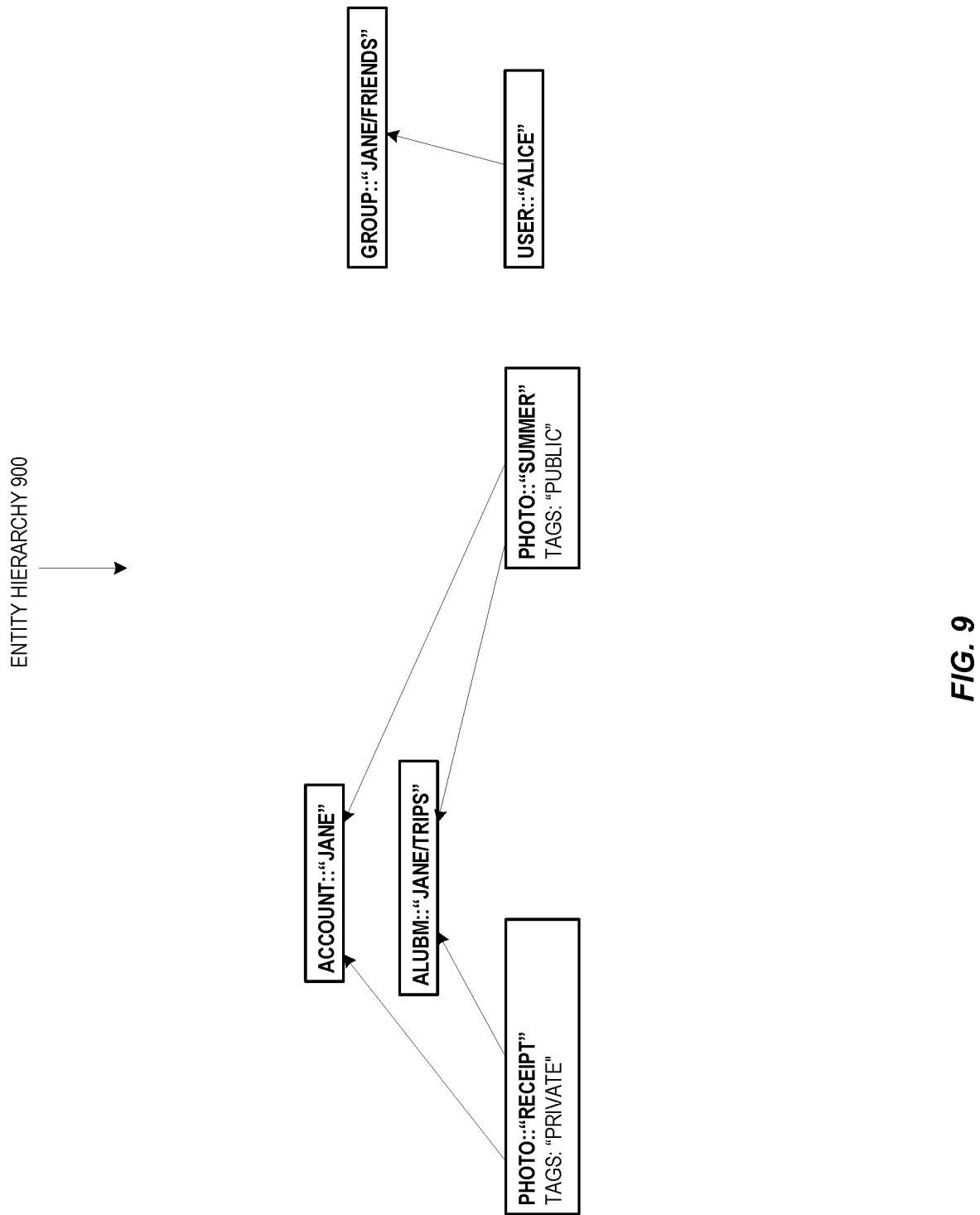
FIG. 9 illustrates an example entity hierarchy.

For example, consider the example entity hierarchy 900 of FIG. 9 and the above example policies c1 and c2. If the authorization request is <P=User::"Alice", A=Action::"view", R=Photo::"summer", X={ }>, the policy c1 is satisfied because User::"Alice" is a descendant in entity hierarchy 900 of Group::"jane_friends", the resource Photo::"summer" is a descendant of Album::"jane_trips" in the hierarchy 900, and the action Action:: "view" appears in the set [Action::"view", Action::"comment" ]. The policy c2 is not satisfied because the tags attribute of Photo::"summer" does not contain "private". Since policy c1 evaluates to true, c2 evaluates to false, and no policy has an error, then the decision is allow for this authorization request.

If the authorization request is <P=User::"Alice", A=Action::"view", R=Photo::"receipt", X={ }>, then policy c1 is satisfied for similar reasons. However, policy c2 is also satisfied because the when condition evaluates to true. This is because the tags attribute of the resource Photo::"receipt" contains "private", and c2's unless condition evaluates to false because the photo is not a member of User::"Alice"'s account. Since forbid policy c2 evaluates to true, the decision is deny for this authorization request.

Policy and Entity Store Slicing

When the authorization engine receives and authorization request, it must determine what information needs to be fetched in order to evaluate the authorization request. In this section on policy and entity store pruning, the following terminology is used:

Authz service. The authz service is a provider network service which handles and responds to authorization requests. It is distinguished from the admin service, which is responsible for create, read, update, and delete operations on policy data.

Authz engine:: The authz engine is, for the purposes of this section, responsible for evaluating policies and producing an authorization result. It is distinguished from the authz service, of which the authz engine is only a component. Each instance of the authz engine is single threaded and runs on a single machine. Any networking, routing, load-balancing, or database components are considered part of the authz service, but not the authz engine for the purposes of this section.

Slice:: A slice is the portion of the entity data or policy data that the authz engine needs in order to evaluate the particular request at hand. Given an authorization request, the authz service computes a slice which contains some subset of the data, and the authz engine evaluates the request against that slice. A key property upheld is that evaluating the authorization request using the slice data always gives exactly the same response as if the authorization request had been evaluated using the entire set of available data, including any error messages or other diagnostics in the response.

Slicing:: Slicing is the process of computing the slice, or the algorithm for doing so. Slicing is performed by the authz service for each authorization request, modulo some portions of the algorithm which may be precomputed and stored.

Select/selected. The slicing algorithm selects data, meaning that the data that is selected needs to be included in the slice for processing by the authz engine.

JIT:: Data is JIT ("just-in-time") if it is provided as part of the authorization request. This is in contrast to data that is hosted (e.g., known before the request arrives), or data that might be pulled on-demand from other external sources.

Head constraints:: A policy's head constraints are the constraints on the principal, the action, and the resource in the policy head and excludes the contents of any when or unless clauses of the policy condition.

Head principal/head resource:: For any policy, the head principal is the entity identifier mentioned explicitly in the policy's principal head constraint. For a policy permit (principal==User::"alice", . . . ), the head principal is User:: "alice". For a policy permit(principal in Group:: "friends", . . . ), the head principal is Group::"friends". For a policy with no principal head constraint, e.g., permit (principal, . . . ), the head principal is a special value ANY. Head resource is defined analogously using the policy's resource head constraint.

Relevant:: A policy is relevant to an authorization request, if the policy's head constraints evaluate to true for that request. This does not mean that the entire policy evaluates to true, just its head constraints.

One type of slicing is policy slicing. Policy slicing involves choosing which policies need to be evaluated against a given authorization request. To facilitate policy slicing, an index of policies can be maintained. The index maps head resources of policies to the policies with those head resources. For example, a given head resource may map to one or more policies containing the given head resource. This index is referred to herein as the policy head resource index.

When a particular authorization request is received, the authz service can use the entities ancestors map to map the resource R specified in the particular authorization request to the set A of all of R's ancestors in the entity hierarchy. Then, the policy head resource index can be used to determine the set P of all polices in the index whose head resource is resource R or any entity in the set A. P may be taken as the policy slice.

It is possible to reduce the policy slice P by evaluating the head constraints for each policy in P and selecting only the relevant polices in P for the final policy slice P'. Policy slice P' may be a smaller, more precise slice than slice P but at the cost of additional computation at slicing time. The smaller slice P' may save on network utilization compared to slice P.

The provider network can host/store some entity data. Other entity data can be provided JIT. For example, the provider network can store entity names and parent relationships. Entity attribute records can be provided JIT.

A provider network database can maintain an index of policies by (head principal, head resource) pairs. This allows efficiently looking up the policies with a given (head principal, head resource) pair. For example, the policy permit (principal, action==Action::"view" resource in Album::"12345") when {·}; is indexed by the pair (ANY, Album::"12345").

The hosted entity database, which contains at least entity names and parent relationships, also maintains the precomputed transitive closure of the parent relationship: each entity contains pointers to each of its ancestors, not just its immediate parents. A special ANY principal and special ANY resource is used for policies whose head principal or head resource is ANY. In the hosted entity database, the ANY principal is the ancestor of all principals, and like for all resources.

When a particular authorization request is received, let the request's principal identifier be P. and the request's resource identifier be R. The authz service will query the policy database using the index described above, and select all policies whose (head principal, head resource) pair is (P, R). Then, it will iterate over P's ancestors and R's ancestors, and also select all policies whose (head principal, head resource) pair is (P or any of P's ancestors, R or any of R's ancestors). This is made more efficient by taking advantage of the precomputed ancestor relation, as described above—compare to the situation in policy slicing when entity data is entirely JIT, where the ancestor relation has to be computed fresh for every authorization request.

Just as above, there are at least two different options when this set of policies is collected: stop here, and select all of the policies found this way via the index: or, store the head constraints of each policy alongside the policy, and evaluate those head constraints (including the action) before selecting only relevant policies. However, just as above, the extra work to evaluate the head constraints probably represents extra complexity for little or no benefit (or even negative benefit on net).

This policy slicing solution will be much more efficient than policy slicing when entity data is entirely JIT in the case when there are many, many small policies in an application. For instance, if an application creates new instances of templates for every user in the application, the number of policies could be a multiple of the number of users, and each policy (template instance) relates to a particular user or resource in its head constraints. The database index described in this section would facilitate avoiding the need to look at all of the policies in the system which match the authorization request's resource.

If some or all entity data is hosted in the provider network and the entity data is not provided JIT, then slicing of the hosted entity data may be performed. Entity data slicing may involve submitting one or more queries to the entity store. The overall algorithm for policy and entity slicing is as follows.

For a given authorization request, the entity store may need to be queried multiple times. The main reason multiple queries may be needed arises from the case where an attribute value contains an entity reference. For example, if a policy asks for principal.manager.level, a query is needed not just for principal, but an additional query is needed for principal.manager; but the principal.manager entity may not be known until the data from the first query is obtained. The authz engine or the validator could enforce a restriction on the lengths of these chains in policy text in order to bound the number of queries required to evaluate a single authorization request.

A first step in the algorithm is to perform policy slicing as described above. Second, for each policy in the policy slice, a determination is made of the entity data needed to evaluate the policy. This determination involves constructing an abstract syntax tree (AST) of the policy and traversing the AST to determine the entity data needed by the policy. This determination is made for all polices in the slice before proceeding to query the entity store for entity data. This way, the number of queries needed to fetch all of the entity data can be reduced. Next, the needed entity data is queried from the entity store. Ideally, all needed entity data can be obtained in one query to the entity store. Even if there were attribute chains involving entities, it is possible the needed entity data was included as a result of the first query due to a different part of the policy, or a different policy. Going back to the above example, a different part of the policy or a different policy may provide that principal.manager is User::"beth". In this case, only one query is needed and an additional query to determine principal.manager is not needed. However, if additional queries can be submitted to the entity store is there is still missing entity data.

Policy Validation

The policy language is dynamically typed. This means the authorization engine detects errors as it evaluates policies (e.g., when it encounters an express such as 1<"hello"). If the evaluation of a policy results in an error, then the evaluation result of the policy is false.

To avoid the possibility of an evaluation error, the policy language system and method provides schema-based policy validation. In particular, given a schema that describes the assumed structure of both entities and queries, the validator will flag those policies that may error during evaluation. The validator is sound: If the validator flags no policies, then no policy will error during evaluation for any entity hierarchy and query that adheres to the prescriptions of the schema.

Validation is optional for users. A user can choose not to run the validator to check policies. For performance, the authorization engine may not run the validator when evaluating policies. When running, the validator assumes that the given schema contains full information for every entity and action mentioned in the policies it considers, and fully enumerates the principal and resource entity types usable with a particular action.

The following is an example of a schema:

```
01:     {
02:         "entityTypes": [
03:         {
04:             "name": "Employee",
05:             "shape": {
06:                 "type": "Record",
07:                 "attributes": {
08:                     "jobLevel": {
09:                         "type": "Long"
10:                     },
11:                     "numberOfLaptops": {
12:                         "required": false,
13:                         "type": "Long"
14:                     }
15:                 }
16:             }
17:         }
18:         ],
19:         "actions": [
20:         {
21:             "name": "remoteAccess",
22:             "appliesTo": {
23:                 "principalTypes": ["Employee"]
24:             }
25:         }
26:         ]
27:     }
```

The above example schema specifies that every entity of type Employee in the entity store has an attribute jobLevel whose value is a Long data type, and another optional attribute numberOfLaptops which is also a Long data type. In an authorization request with action Action::"remoteAccess," the principal should always be an entity of type Employee.

Now consider validation of the when clause of the following policy:

```
01:     permit(principal, action == Action::"remoteAccess", resource)
02:     when {
03:        principal.quarantineLevel < 5 &&
04:        principal.jobLevel > "foo" &&
05:        principal.jobLevel == "foo"
06:     }
```

For evaluation of a given authorization request to reach the when clause, the query must satisfy the policy head constraints. Thus, the action must be Action::"remoteAccess." Based on the schema, the validator can assume that the principal is an Employee and thus that it has a jobLevel attribute. With this, the validator will report an error or warning on each of the comparisons within the when clause (Lines 03-05).

The validator will report a validation error for Line 03 because the principal is not guaranteed to have the optional quarantineLevel attribute. So, the attribute access may raise a runtime error. A validation error would also be reported if the policy contained an attribute that was not present in the schema (e.g., age) or contained a typo such as principal.jobbLevel.

The validator will report a validation error for Line 04 because the right operand of > is a string, but the >operator only accepts Longs, so the >operator in Line 04 will always raise a runtime error at evaluation time.

The validator will report a validation error or warning for Line 05. The left operator of ==is always a Long, the right operand is always a string, and the ==operator returns false if its operands have different runtime data type. So, this comparison will always return false. While this will not cause an evaluation time error, it is probably not what the author of the policy intended.

Validation comprises a type checking step, along with other steps. As in most programming languages, the main purpose of type checking is that each policy language operator has requirements on the types of its operands and returns a result of a given type. For example, x >y requires that x and y both have type Long, and it returns a Boolean value. The validator reports an error if an operand does not have the required type: either x >y where the type of y is not Long, or x.jobLevel where the type of x does not have an attribute named jobLevel. For the equality==case, success will be possible if two operands have the same type. Optional attribute accesses, as in Line 03 above, should be preceded with a has check, e.g., as follows:

03: principal has quarantineLevel && principal.quarantineLevel<5 &&

The has expression in the left operand of the && is used to determine that the access to the optional quarantineLevel attribute will not raise a runtime error. The && expression short circuits, so the whole expression evaluates to false without evaluating the right operand when the attribute is not present. This could be equivalently written with the has in the condition of an if expression and the attribute access in the then branch.

The validator compares the policy set with the schema to look for inconsistencies. From these inconsistencies, the validator will be able to do the following:

(1) Detect unrecognized Entity Types such as, for example, misspelling "Album" as "Albom."
(2) Detect unrecognized Action such as, for example, misspelling Action:: "viewPhoto" as Action:: "viewPhoot."
(3) Detect Action applied to unsupported Principal/Resource sch as, for example, saying a Photo can view a User.
(4) Detect improper use of IN or ==(provide a hint about proper use) such as, for example, writing principal in Album::"trip" but principal cannot be a Photo.
(5) Detect unrecognized attributes such as, for example, e.g., principal.jobbLevel (which is a typo and should be "jobLevel").
(6) Detect unsafe access to optional attributes such as, for example, principal.numberOfLaptops where numberOfLaptops is an optional attribute (declared with "required": false). These should be guarded by has checks as in if principal has quarantineLevel then principal.quarantineLevel else 0. Alternatively, principal has quarantineLevel && principal.quarantineLevel<2.
(7) Detect type mismatch in operators such as, for example, principal.jobLevel>"14" which is an illegal comparison of a Long with a String.
(8) Detect policies that will always evaluate to false, and thus never apply such as, for example, condition of policy is: when {["hello" ].contains(1)}. This condition always evaluates to false, so the policy never applies.

Actions in the actions part of the schema may specify the expected format of the context, so the above-listed errors can be flagged on references to context in the condition portion of policies, too.

Other types of validations are possible. For example, the validator can detect unsafe accesses of optionally-present attributes by a process called occurrence checking. An attribute of an entity may be designated as optional in a schema. Yet a policy may be authored that accesses the attribute of the entity without first checking whether the entity has the attribute. The validator can detect this type of error by checking for the use of the has operator on the entity for the attribute before accessing the attribute such as, for example, as in the expression principal has someoptionalattribute && principal.someoptionalattribute=="someval". In this expression, principal refers to an entity whose attribute someoptionalattribute may not always be present. The expression principal has someoptionalattribute will return true if the attribute is present for the given entity. The short-circuiting behavior of && then proceeds to safely evaluate the clause principal.someoptionalattribute=="someval". If principal has someoptionalattribute had returned false, then the && would immediately return false and not evaluate the other clause.

The validator can detect this situation by making its type checking step flow sensitive. Each time an expression of the form someentity has someattribute is reached, the validator knows that expressions that must be executed after the has-expression can rely on someattribute being present. However, expressions that do not necessarily follow the has-expression cannot rely on the attribute being present. Information from multiple has-expressions can be aggregated so that expressions such as the following can be validated: principal has attributeA && principal has attributeB && principal.attributeA==principal.attributeB.

Union types could also be used to validate a condition that could apply to values of multiple possible types. For example, suppose in the following conditional expression both User type and Anon type must have anAttribute: (if principal.isPrivate then User::"AlicePrivate" else Anon:: "Public").anAttribute. The type of the (if principal.isPrivate then User::"AlicePrivate" else Anon::"Public") portion can be a union User|Anon. During type checking, the validator will allow attribute dereferences in union types if each type in the union has the attribute, as is the case in our example.

Typing by cross product is also possible. Here, a policy can be validated for each combination of principal and resource type in the actions specification of the schema. This provides better precision compared to the alternative of validating the policy once while specifying the principal and the resource as a union type of each of their specified possibilities. A benefit of validating by cross product is fewer false positives compared to when using union types.

The validator could also operate in permissive mode. In permissive mode, the schema can be partial. In particular, entity types can be named but without information about their attributes or entity hierarchy membership. When an expression with such incomplete entity type is used in an expression, the validator can infer information about the type from the usage, and make sure that usage is always consistent. For example, if principal has type User but User is specified incompletely in the schema, then an expression such as principal.name like "Alice*" can be accepted by the validator—the expression implies that User has a name attribute that can be used as a string. However, an expression of the form principal.name like "Alice*" && principal.name>5 may be flagged as invalid, since the User name attribute cannot be used both as a string and as a Long, which would have to be true in order for this expression to evaluate without error.

Validation Schema

A validation schema is authored in JSON or the like (e.g., XML, YAML, Protobuf, or other suitable data serialization format). The schema contains an optional namespace declaration and two lists:

(1) the entity types specification, and
(2) the actions specification.

These are identified in the schema via keywords "namespace", "entityTypes", and "actions", respectively.

The namespace declares a global namespace to be applied to all entity types and actions declared in the schema. The entityTypes list describes the type of each entity that may appear in the entity hierarchy, including the entity type's attributes and the parent/child relationship that entities of that type can have to other entities in the hierarchy, if any. The actions list contains the entity IDs of entity type Action that may be used as actions in authorization requests, as well as assumptions on the principal, resource, and context parts of the request submitted with that action. Since actions are also entities, this part of the schema lists hierarchy information too.

Each entry in the entityTypes list is a JSON or JSON-like object with the following properties:

(1) name: The name of the entity type as a string. This must be an identifier, which is defined in the policy language grammar as a sequence of alphanumeric characters, omitting any reserved words of the policy language. If the schema declares a namespace, then this type name is qualified by that namespace to form a fully qualified entity type which must be used when referencing this type in a policy.

(2) memberOf: A list containing strings which are the entity types that can be direct parents of an entity with this entity type. Such entity types must be valid entity type identifiers declared in the schema. If the memberOf list is empty, or the property is not defined, then the entity type cannot have any ancestors in the entity hierarchy.

(3) shape: A JSON or JSON-like object following the JSON or JSON-like schema-style format with custom type property values for policy language types. The top level of this object must have the property "type": "Record", as the validation treats entity attributes as a kind of record in this schema. Entity attributes may be declared as optional using the required property described for Record types below.

Each entry in the actions list is a JSON or JSON-like object with the following properties:

(1) name: The identifier for the action as a string. This is an entity identifier rather than an entity type, so it can contain anything that would be valid inside a policy language string. When combined with the entity type Action, this forms the complete entity identifier for the action entity. If the schema declares a namespace, then the entity type Action is qualified by that namespace.

(2) memberOf: A list containing strings which are action identifiers that are direct parents of this action in the hierarchy of actions. Note that this memberOf property is more precise than the entityTypes memberOf property. This list defines complete action identifiers, and defines the hierarchy of actions directly, whereas the entityTypes list only identifies type-level relationships in the hierarchy. This implies there should be no cycles in the actions memberOf relationships but there can in normal entity types. For example, it would be wrong for action "get" to have memberOf include itself, but it would be fine for entity type Album to include itself in its memberOf list.

(3) appliesTo: A JSON or JSON-like object containing two lists, principalTypes and resourceTypes, which contain the principal and resources entity types that the action can accompany in an authorization request. If the appliesTo property is absent from the actions element object, then it is assumed the action could appear in an authorization request with any entity type for principal and resource. Both the principalTypes and resourceTypes can be empty lists to represent an action that cannot be used in an authorization request with any entity types. When these lists are empty, and the actions is included in the memberOf list on some descendant action, the action can be used as an action group in an in condition, but cannot be used directly as an action.

(4) context: A JSON or JSON-like object in the same format as entity shape property which defines the attributes that must be present in the context record in authorization requests made with this action.

The schema format uses a JSON schema-like or like structure for declaring entity attributes and contexts. Different values for the type property are used to support policy language types.

(1) String, Long, and Boolean types are used to encode the primitive policy language types.

(2) Set encodes the policy language set type. Used together with a property element to hold the type of elements in the set.

(3) Record encodes policy language record types. The attributes property is a map from record attribute names to their type. The type of each attribute is structured using this JSON or JSON-like format, but with an additional property required. The required attribute specifies if the attribute is always present in the record.

The required property is true by default. Setting to false means the attribute can be absent from the record, so specific checks will be required before safely accessing the attribute.

(4) Entity encodes policy language entity reference types. This is used together with a property name which specifies the type of the referenced entity. The value of name is again a policy language Name.

Differential Random Testing

Figure 10:
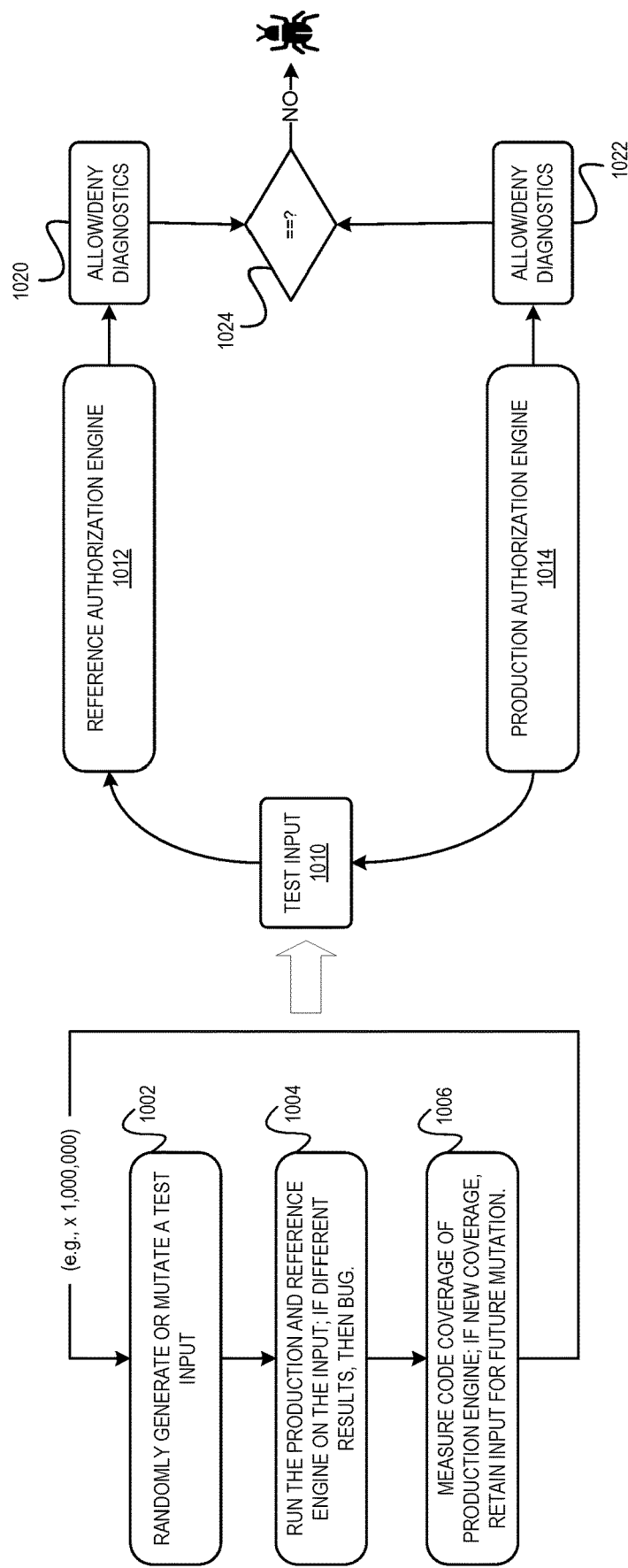
FIG. 10 illustrates a system and method for differential random testing of an authorization engine.

FIG. 10 illustrates a differential random testing approach for testing the policy evaluation functionality of a production authorization engine 1014. A standard test testing approach could attempt to come up with a specific test input or set of test inputs that encompass authorization requests, an entity store, and a set of policies. The standard testing approach could require a significant amount of work to produce test input that provides near complete or complete coverage of the programmed functionality of the production authorization engine 1014 encompassing the various code branches of the programming language code that implements the production authorization engine 1014. Not only would the standard testing approach require creation of test input data, it also requires creation of expected output data. In particular, for each test case, a correct expected output would need to be generated encompassing the correct allow or deny decision and any diagnostic information. With the standard testing approach, the production authorization engine 1014 is fed the test input and the output of the production authorization engine 1014 for this test input is compared to the expected output. A difference between the actual output and the expected output indicates a bug in the production authorization engine 1014. The standard testing approach is impractical for adequately testing the production authorization engine 1014 because of the difficulties involved in generating a set of test inputs and corresponding set of expected outputs that provide sufficient coverage of the programmed functionality of the production authorization engine 1014. This difficulty stems from the wide range of possible policies that can be input to the production authorization engine 1014. Generating the expected output is also difficult because it requires complete and proper understanding of the entire policy language specification.

In addition to or as an alternative to testing the production authorization and engine 1014 using a standard testing approach, a differential random testing approach is used to test the production authorization engine 1914. The differential branding testing approach uses a reference implementation of the production authorization engine 1014 referred to in FIG. 10 as reference authorization engine 1012. The reference authorization engine 1012 provides the same functionality as the production authorization engine 1014 but with a simpler implementation. For example, the reference authorization engine 1012 can be implemented in a high-level programming language such as a high-level imperative and functional compiled language. For example, the reference authorization engine 1012 can be implemented in a verification aware programming language such as the DAFNY programming language. Further, the reference authorization engine 1012 implementation can be simpler with respect to the production authorization engine 1014 in that the reference authorization engine 1012 need not be as concerned with scaling or concurrency issues. The reference authorization engine 1012 simply needs to be able to evaluate a request, an entity store, and a set of policies in an amount of time that is reasonable for testing purposes. For example, it is not required that the reference authorization engine 1012 be able to evaluate multiple authorization requests concurrently or in parallel. The result of the simpler implementation of the reference authorization engine 1012 is that it contains fewer lines of code than the production authorization engine 1014 and consequently probably has fewer bugs. Overall, the reference authorization engine 102 can be programmed using a programming language that is easy to read and the implementation need not be optimized for performance. For example, the reference authorization engine 1012 can be programmed in a different programming language than the programming language used to implement the production authorization engine 1014. In other words, the reference authorization engine 1012 needs to simply be an executable specification of the policy language semantics. Thus, a programming language in which it the specification is most naturally expressed can be used to implement the reference authorization engine 1012. In one example implementation, the reference authorization engine 1012 is implemented in about 500 lines of code while the production authorization engine 1014 is implemented in about 10,000 lines of code.

FIG. 10 provides a method for differential random testing of the production authorization engine 104. At step 1002, a coverage guided random testing approach is used to randomly generate or mutate a test input 1010. With the coverage guided random testing approach, an initial test input is randomly generated such that the initial test input is correct syntactically according to the policy language grammar. As test inputs are executed by the production authorization engine 1014, coverage of the code that implements the production authorization engine 1014 is tracked. If execution of the test input results in increased coverage of the code, then the test input is retained in a set of test inputs that are used to generate future test inputs by mutation of those retained test inputs.

At step 1004, the test input 1010 is input to both the reference authorization engine 1012 and the production authorization engine 1014. The test input 1010 encompasses an authorization request, an entity store, and a set of policies. As a result, the reference authorization engine 1012 produces output 1020 for test input 1010 and the production authorization engine 1014 produces output 1022 for test input 1010. At operation 1024, the output 1020 of the reference authorization engine 1012 is compared for equality to the output 1022 of the production authorization engine 1014. If the outputs 1020 and 1022 are not equal, then there is a bug. The two outputs 1020 and 1022 are equal if they reflect the same allow or deny or error decision and identify the same set of policies in the diagnostics. if the two outputs 1020 and 1022 are not equal, then there is a bug in the reference authorization engine 1012 or the production authorization engine 1014. Since the reference authorization engine 1012 implementation is less complex than the implementation of the production authorization engine 1014, the bug is likely to be with the production authorization engine 1014.

At step 1006, if evaluating test input 1010 provided increased coverage of the code that implements the production authorization engine 1014, then the test input 1010 is retained for future mutation. The steps 1002, 1004, and 1006 are repeated a number of times each time with a new test input. For example, the steps could be repeated a million times or so. The number of times to repeat the steps can be determined based on the code coverage of the production authorization engine 1014. For example, if after running the steps for a period of time, the code coverage appears to plateau at a maximum, then the testing loop can be stopped. It should be noted that some code of the production authorization engine 1014 may be unreachable when evaluating test input. Thus, the maximum code coverage may be less than 100%.

Strict Validation for Policy Analysis

The SMT analysis of the policy language system and method requires policies to pass strict type checking requirements prior to symbolic evaluation and encoding to SMT. The validator of the policy language system and method encompasses a type checking and transformation pass that satisfies these requirements and allows the policy analysis to be performed on more policies than would be possible with a naïve implementation of the strict type checking rules.

Policy language policies are polymorphic in the sense that a given policy can apply to multiple combinations of Principal, Action, Resource, and Context types. The validator type checks the policy for each applicable combination of types and considers the following three cases:

(1) The policy is rejected because one of the combinations has an error. Such policies are never translated to SMT.
(2) The policy is rejected because each combination is typed as false. Such policies are never translated to SMT.
(3) The policy is accepted because none of the combinations error, and at least one is not typed as false. In that case, policy is analysis is applied separately to each of the non-false type combinations, and if the policy satisfies the desired property under each combination, then the policy as a whole satisfies the property. This reasoning can be extended to properties like subsumption or equivalence that involve more than one policy.

The validator accepts policies as in case (3) above. However, some of these policies can cause the symbolic evaluator of the policy analysis (described below) to error because the policies cannot be translated to SMTLib. SMTlib is a standard input language for SMT solvers. For example, principal.rec==resource.rec, where the two fields contain records that aren't identical but that do have a well-defined least upper bound. A policy like this cannot be translated because the symbolic evaluator requires the left and right hand side of ==to have identical types, like the underlying type system for SMTLib terms.

Thus, what is needed is the ability to rule out untranslatable policies prior to symbolic evaluation.

A possible approach is to modify the validator to include a strict mode: a flag that tells it to enforce the strict typing constraints instead of its normal (more lenient) typing constraints. However, this approach would complicate the validator, and it would cause the overall analysis to reject more policies than needed. For example, the strict typing rules will always reject a policy with the expression principal has active && principal.active when the principal type has no declared active attribute in one of the type combinations. In contrast, the normal validator simply types this expression as false and may accept the policy as a whole according to case 3 above.

Consequently, the validator is kept as is and an additional strict type checking and transformation (STT) pass is added for case 3 above. If a policy passes normal validation and if each non-false combination passes the STT pass, then then policy analysis can be applied to the results of the STT pass. Otherwise, the STT pass reports an error.

To implement STT, c0-operation from the validator is used. Specifically, the validator outputs the inferred type of each node in the policy AST, for each combination of types. The STT pass then checks and transforms these fully type-annotated ASTs as follows:

(1.) For each if expression:
(1.1) If the condition is typed as true, recurse on the then branch and return the resulting strictly typed node.
(1.2) If the condition is typed as false, recurse on the else branch and return the resulting strictly typed node.
(1.3) Otherwise, recurse on both branches and error if the resulting nodes don't have the same strict type.
(2.) For each== comparison:
(2.1) If the comparison is typed as true or false, just return the literal true or false, respectively, without recursing on the arguments. The strict type of the result will be Boolean.
(2.2) Otherwise, recurse on both sides and error if the resulting strict types aren't the same.
(3.) For every other Boolean-valued expression, such as has, !, ||, &&, etc:
(3.1) If it's typed as true or false, just return the literal true or false, respectively, without visiting the node's children. This is a correct transformation because the validator is sound.
(3.2) Otherwise, recursively transform and check all sub-expressions.

A policy accepted by both the validator and the STT pass satisfies strict typing requirements as follows. First, note that the validator will perform occurrence checking, so expressions like the problematic example principal has active && principal.active will be typed as false when the principal type has no active field. Next, note that STT pass will transform all nodes with the type false into the constant false. In the running example, this means that principal has active && principal.active becomes the node false, which satisfies the strict typing rules trivially and is therefore translatable. Finally, note that these transformations are all correct because the validator is sound.

Reducing the Policy Language to SMT Via Schema-Driven Symbolic Evaluation

The policy language system and method encompasses a policy language symbolic evaluator which functions to reduce a policy language expression into SMTLib language. The symbolic evaluator functions to produce a SMT encoding of policy language expressions that is decidable, sound, and complete.

Using Reduction Engines to Answer Universal Questions

The policy language system and method encompasses a Satisfiability Modulo Theories (SMT) policy analyzer that functions to answer universal questions about policy language policies by reducing these questions to SMT queries. For example, the SMT policy analyzer can answer the following questions about the policy language:

Equivalence: Do two policies produce the same authorization decision on every input (principal, action, resource, context, and entity store)? A variant of this question is whether two sets of policies produce the same result on every input. With an answer to this question, there are opportunities for policy optimization such as, for example, replacing a set of complex policies with a simplified policy that has the same effect.

Subsumption: Does a forbid policy evaluate to true on all inputs on which a permit policy evaluates to true? If so, then the permit policy is useless because it does not add any new permissions because it will always be overruled by the forbid policy.

Triviality: Does a given policy evaluate to true or does the given policy evaluate to false on every input? If so, then the policy is equivalent to a Boolean constant in terms of its behavior. For example, a trivially true permit policy permits all requests which is a security problem, and a trivially true forbid policy denies all requests which is an availability problem.

Answering the above questions are non-exhaustive examples of what the SMT-based analysis can do. More generally, the policy analyzer can answer any first-order question about policy behavior.

Functionally, the authorization engine takes as input a policy c, an authorization request q, and an entity store s and returns either true or false or an error. The request q specifies the principal, action, resource, and request context. In other words, the authorization engine encompasses a function eval from polices, requests, and entity stores to the type Option<Bool>. These properties can be expressed as first-order formulas over the results of the authorization engine. The SMT policy analyzer can be used to determine the validity of these formulas such as, for example, for equivalence questions about two policies $c[1]$ and $c[2]$ by:

Equivalence:∀request $q$,entity store $s$.(eval(policy $c[1]$,request $q$,entity store $s$))=Some(true))⇔ (eval(policy $c[2]$,request $q$,entity store $s$)=Some (true)).

More generally, suppose that f is a first-order n-ary predicate over Option<Bool>. In the equivalence example above, f is a bi-implication between two equality comparisons. More generally, f can be any Boolean combination of operations on Option<Bool>. Given an f and a set of n policies $c[1], \ldots, c[n]$, the SMT policy analyzer can check if the following universal statement is always true:

∀request $q$,entity store $s$.f(eval(policy $c[1]$,request $q$,entity store $s$), . . . ,(eval(policy $c[n]$,request $q$,entity store $s$)).

Figure 11:
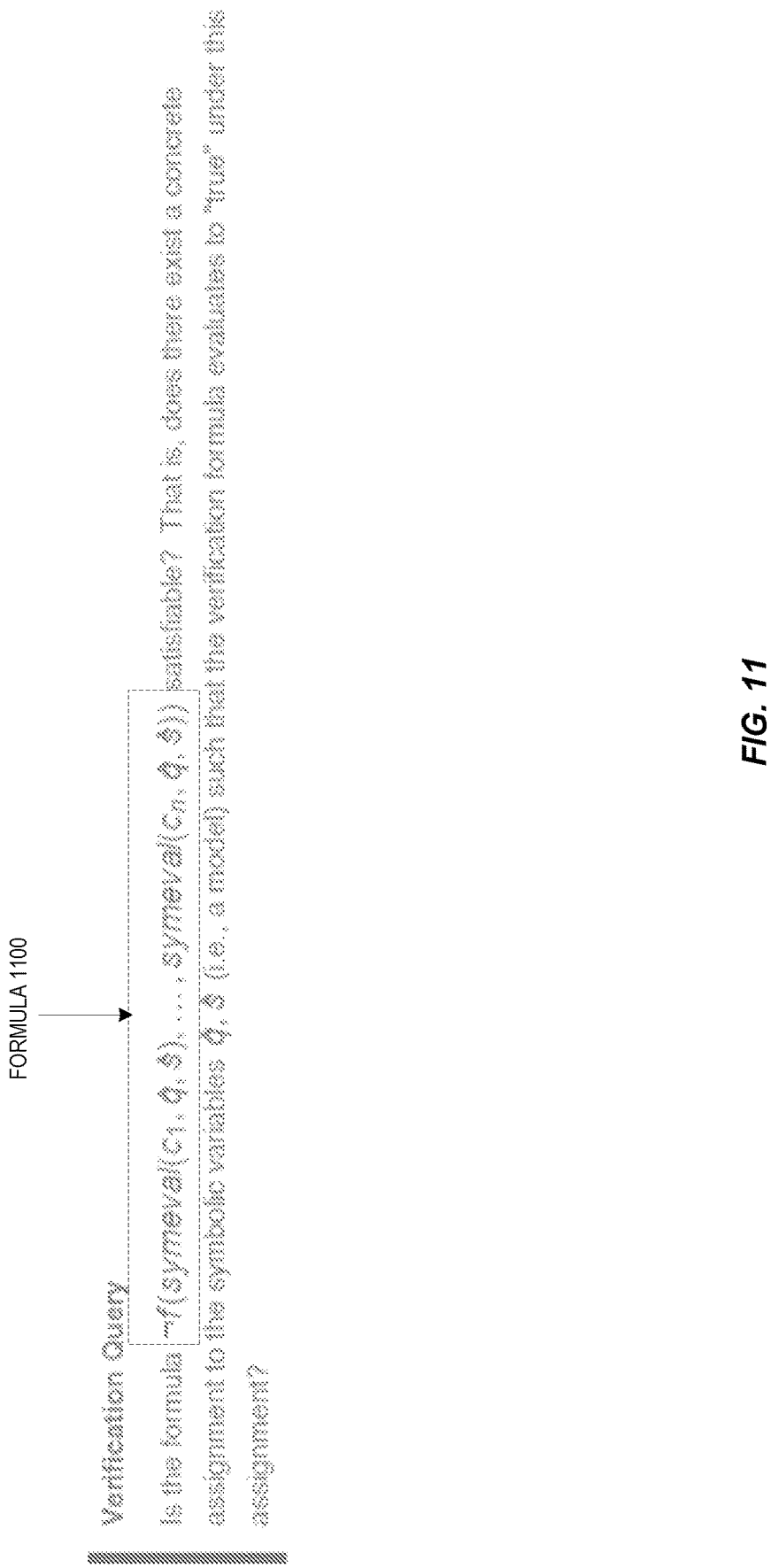
FIG. 11 presents a Satisfiability Modulo Theories (SMT) formula.

The SMT policy analyzer functions by symbolically evaluating the policies $c[1], \ldots, c[n]$ with respect to with respect to symbolic request $\hat{q}$ and symbolic entity store $\hat{s}$. An SMT solver is invoked to check whether the negation of the desired property is unsatisfiable. Referring to FIG. 11, if the SMT solver finds that formula 1100 is unsatisfiable, then the property f holds on all possible inputs. Otherwise, the SMT solver has determined a concrete input on which the property f fails to hold.

In formula 1100, the symbolic evaluation function symeval( ) takes as input a policy $c[i]$, a symbolic request $\hat{q}$, and a symbolic store $\hat{s}$. A symbolic value represents an arbitrary concrete value of a given type.

Given these inputs, symeval(policy $c[i]$, symbolic request q, symbolic store $\hat{s}$) produces a symbolic value that represents the behavior of policy $c[i]$ on an arbitrary concrete input. In other words, symbolic request $\hat{q}$ and symbolic store $\hat{s}$ are variables in the verification formula 1100, and symeval (policy $c[i]$, symbolic request $\hat{q}$, symbolic store $\hat{s}$) is an expression in the SMTLib language over these variables that represents all possible behaviors of the policy $c[i]$. The SMT solver searches for an assignment of the symbolic variables to concrete values that makes the verification formula 1100 true. Such an assignment is referred to as a "model" of the verification formula 1100.

Decidability, Soundness, and Completeness

As mentioned, symeval(policy $c[i]$, symbolic request $\hat{q}$, symbolic store $\hat{s}$) produces a symbolic value. The symbolic value should be decidable, sound, and complete encoding of the behavior of the behavior of policy $c[i]$ on an arbitrary concrete input.

An encoding is decidable if the SMT solver can answer every verification query over that encoding with a satisfiable ("yes") or unsatisfiable ("no"). If the encoding is undecidable, then the SMT solver may not be able to answer some queries. In practice, undecidability typically manifests as SMT solver timeouts or the SMT solver returning "unknown" instead of satisfiable or unsatisfiable.

An encoding is sound if the unsatisfiable answer to a verification query over the encoding means that the property f is guaranteed to hold for the policies $c[1], \ldots, c[n]$ on all possible concrete inputs. In other words, the unsatisfiable answer for a sound encoding constitutes a proof that the property holds. If the encoding is unsound, then the unsatisfiable answer is not a proof, and a policy analysis based on an unsound encoding can miss bugs (i.e., violations of the property f).

While necessary, soundness alone is not sufficient to guarantee that an SMT analysis gives useful results. This is because soundness guarantees only that an unsatisfiable answer is meaningful—it proves the absence of violations. But if a sound SMT analysis returns satisfiable, then only conclusion is that the SMT analysis was unable to find a proof, even though one might exist. So, a trivial analysis that always returns satisfiable is sound, though not useful. This is why the encoding should also be complete in addition being decidable and sound.

An encoding is complete if the satisfiable answer to a verification query over the encoding means that the model of the verification formula 1100 corresponds to a concrete input (query q and entity store s) on which the policies $c[1], \ldots, c[n]$ violate the property f. In other words, the satisfiable answer comes with a model that constitutes a witness–a concrete request q and entity store s such that f(eval(policy $c[1]$, request q, entity store s), . . . , eval(policy $c[n]$, request q, entity store s) is false. If the encoding is incomplete, then the satisfiable model may not be a witness, and a SMT policy analysis based on an incomplete encoding can produce false positives.

Completeness is the dual of soundness. Completeness guarantees only that a satisfiable answer is meaningful—it provides a witness showing f is violated. But if a complete SMT analysis returns unsatisfiable, the only conclusion is that the SMT analysis was unable to find a witness, even though one might exist. So, a trivial SMT analysis that always returns unsatisfiable is complete, though not useful.

An SMT analysis that is both sound and complete guarantees that both the unsatisfiable and satisfiable answers are meaningful. The unsatisfiable answer constitutes a proof of correctness because of soundness, and the satisfiable answer constitutes a concrete witness to incorrectness because of completeness.

Schema-Driven Symbolic Evaluation for the Policy Language

It is typically impractical to design a decidable, sound, and complete encoding for a rich policy language. Existing SMT analysis systems for authorization policy languages choose soundness over decidability and completeness, relying on heuristics to minimize the side effects of undecidability (e.g., timeouts in the SMT solver) and incompleteness (e.g., false positives).

The policy language system and method makes a different tradeoff. In particular, the policy language system and method encompass a symbolic evaluator that achieves a decidable, sound, and complete encoding on a practically important subset of the policy language, instead of sacrificing one or more of these properties to support the full policy language. Specifically, the encoding focuses on policies that are strictly typed. The symbolic evaluator rejects policies that are not strictly typed. And for the policies that are strictly typed, the symbolic evaluator produces a decidable, sound, and complete encoding of those policies behavior.

The policy language is dynamically typed. This means that the authorization engine assigns meaning to every expression in the language. For example, the expression 1<"hello" is a syntactically well-formed expression in the policy language. Evaluating this expression results in a runtime error. In other words, eval(1<"hello", request q, entity store s)=None. The full dynamic semantics of the policy language is difficult or impractical to encode in SMT as it requires the use of quantified formulas which, in general, are undecidable.

Avoiding the use of quantifiers leverages two insights. First, the policy language symbolic evaluator is restricted to work only on strictly typed expressions. By doing so, it is possible to reduce verification queries over such expression to quantifier-free formulas in a combination of decidable SMT theories. This reduction provides a sound and decidable encoding of strictly type policy language expressions to SMT. The reduction is schema-driven in the sense that the symbolic evaluator leverages policy language schemas to check that the inputs are strictly typed, and to generate the corresponding well-typed SMT encoding as a schema-based representation of symbolic values.

The only source of incompleteness in the reduction comes from the well-formedness assumptions on the ancestors relation on policy language entities. This ancestors relation maps a policy language entity to the set of its ancestors in the underlying entity hierarchy. The ancestors relation is modeled by the entity ancestors map in the entity store (see FIG. 3). The hierarchy is assumed to be a directed acyclic graph (DAG), and a well-formed ancestors relation must represent the transitive closure of a DAG. In general, it is not possible to express the transitive closure of an arbitrary graph in first-order logic. This issue can be circumvented by virtue of the property of a policy language expression which is that it may reference only a bounded number of entities. This observation is used to generate well-formedness assumptions that make the reduction complete.

Strictly Typed Expressions

As mentioned, the policy language is dynamically typed, meaning that the authorization engine will detect type errors at runtime, as it evaluates policy expressions. To avoid the possibility of an evaluation error, the policy language provides schema-based policy validation described in greater detail herein. Given a schema that describes the assumed structure of both authorization requests and entities, the validator rejects policies that may error during evaluation. If the validator accepts a policy, the validated policy will not error during evaluation by the authorization engine for any entity hierarchy and query that adheres to the prescriptions of the schema.

A strictly typed policy can be reduced to SMT using the policy language symbolic evaluator. The validator can identify policies that are not strictly typed. A policy can be rewritten if does not pass the strict type checker of the validator. For example, least upper bound checks in policies can be replaced with equality checks.

Consider the example schema of FIG. 12. Schema 1200 specifies the types of the principal, action, resource, and context variables that constitute a request, and schema 1200 specifies the shape of the entity store. The entity schema specifies the attributes of each entity, and its memberOf relation, if any. The memberOf relation lists all allowed ancestor types for an instance of a given entity type. For example, an Employee may have a Team or a Department as its ancestor in the entity hierarchy. Similarly, a Team or Department may be part of another Department. These are the only two hierarchal relations allowed by schema 1200. For example, it would be a type error according to schema 1200 to have an expression in a policy of "resource in principal" because an Employee can never be an ancestor of a Document in the entity hierarchy.

Consider standard validation of the following policy A:

```
01:     permit(principal, action == Action::"remoteAccess", resource)
02:     when {
03:         (if principal.jobJevel < 5
04:             then principal
05:             else {numberOfLaptops: 1}).numberOfLaptops <= 1
06:     }
```

The standard validator will accept this policy. The validator can determine from policy A and schema 1200 that the type of the then branch is the entity type Employee and that the type of the else branch is the record type {numberOfLaptops: Long}. These two types have a least upper bound, which is a record type that is guaranteed to contain the attribute numberOfLaptops of type Long. It is therefore always safe to access this attribute on the if-then-else expression. Such access will never cause an evaluation time error.

However, policy A will not pass strict type checking because the strict typing rules require the types of the then and else branches of a condition to be identical. Thus, policy A is not strictly typed and cannot be reduced to SMT. However, policy A can be rewritten as equivalent policy A' so that it passes strict type checking as follows

```
01:     permit(principal, action == Action::"remoteAccess", resource)
02:     when {
03:         if principal.jobJevel < 5
04:         then principal.numberOfLaptops <= 1
05:         else true
06:     }
```

It should be noted that it is not always possible to rewrite a validated policy to be strictly typed. For example, consider the following policy B:

```
01:     permit(principal, action == Action::"remoteAccess", resource)
02:     when {
03:         principal.addresses.contains({"zip": "90210"})
04:     }
```

Policy B passes standard validation because:
(1) the expression principal.addresses has type Set<R1>, where R1 is the record type {zip: String, street: ?String};
(2) the argument to contains has type R2={zip: String}; and
(3) Types R1 and R2 have a least upper bound (which is R1 in this case).

The strict type checker will reject policy B because the strict type checker requires the types R1 and R2 to be identical. Policy B cannot be rewritten so that it passes strict type checking.

Generally, a validated policy cannot be rewritten to pass strict type checking if it involves operations on sets of records where the underlying record types are not identical. In particular, if the expressions e1 and e2 have types Set<R1> and Set<R2>, respectively, then R1 and R2 must be identical for the set of operations on these expressions to be strictly typed (e.g., e1==e2, e1.containsAll(e2), and e1.containsAny(e2)).

Schema-Based Representations of Symbolic Values

To reduce a strictly typed policy to SMT, the symbolic evaluator symbolically evaluates the policy with respect to a symbolic request q̂ and a symbolic entity store ŝ. Both the symbolic request q̂ and the symbolic entity store s input must conform to the schema used to type check the policy.

Figure 13:
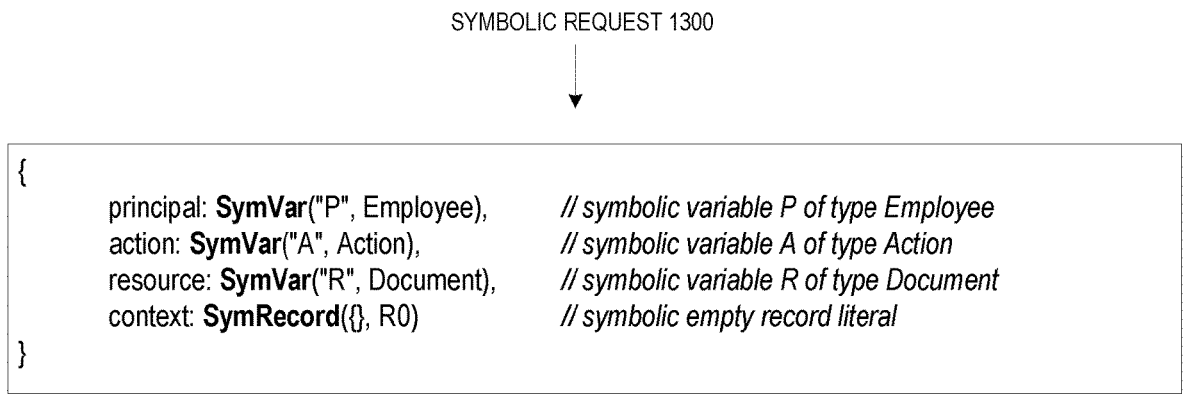
FIG. 13 presents an example symbolic authorization request.
Figure 14:
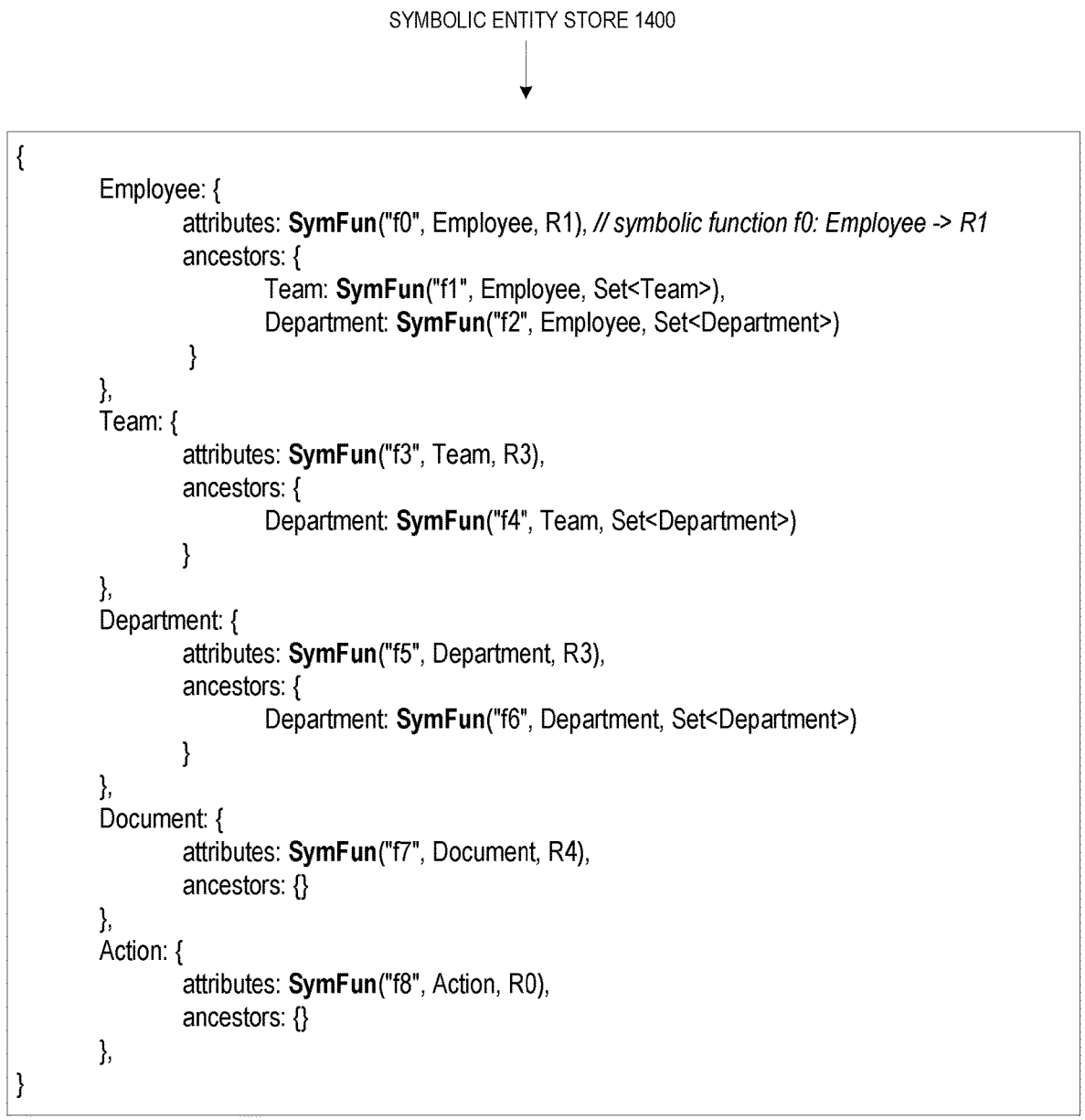
FIG. 14 presents an example symbolic entity store.

To illustrate by example, FIG. 13 provides an example symbolic request 1300 for the example schema 1200. FIG. 14 provides an example symbolic entity store 1400 for the example schema 1200. In the examples, names are introduced in record types 1500 of FIG. 15 for the anonymous record types defined in the schema 1200 to make the symbolic representations easier to read.

The symbolic request 1300 and symbolic entity store 1400 are represented using a set of symbolic values, to which types are assigned according to the request schema and entity schema of schema 1200.

The symbolic request 1300 encompasses four symbolic values, one for each request field. In the example, the principal, actions, and resource fields are assigned to fresh symbolic variables of type Employee, Action, and Document, as required by the request schema. A symbolic variable represents an arbitrary value of a given type such as, for example, SymVar("P", Employee) represents and arbitrary (unknown) value of type Employee. The context field in the example request 1300 is assigned a symbolic empty record literal. This is a symbolic value that represents one specific concrete value—the concrete empty record literal. Every concrete policy language value can be represented as a symbolic literal value such as, for example, the concrete entity reference Employee:"Jane" becomes the symbolic literal value SymEntity(Employee, "Jane"). The notation q̂[principal] is used to refer to the symbolic value stored in the request's principal field. This is SymVar("P", Employee) in the example. It should be noted that if the context in example request 1300 had a richer type such as, for example, the record {timestamp: Long} instead of the empty record type { }, then the context would be a symbolic variable of that that richer type (e.g., record type {timestamp: Long}).

The symbolic store 1400 encompasses a set of symbolic functions, which map entities of a given type to their attribute records and to their ancestor sets. A symnbolic (uninterpreted) function represents an arbitrary map of a given type; for example, SymFun("f0", Employee, R1) represents an arbitrary map from values of type Employee to values of record type R 1 of record types 1500 of FIG. 15. The symbolic functions in the ancestors field collectively represent the ancestors relation for given entity type. For example, the full ancestor relation for the Employee type is represented by two symbolic functions, $f_1$ and $f_2$, which map each Employee to a (possibly empty set) of its ancestors of type Team and Department, respectively. The bracket notation is used to refer to the store contents: in our example, ŝ[Employee][ancestors][Team] refers to the symbolic function SymFun("f1", Employee, Set<Team>).

The symbolic variables and functions given in symbolic request 1300 and symbolic store 1400 are the only unknowns in the encoding the symbolic evaluator sends to the SMT solver. The SMT solver searches for a concrete assignment to these variables and functions that violates a given verification query. For example, consider the triviality analysis to check if the above example strictly typed policy A' is always true.

Policy A' is not always true. The SMT solver produces a witness that shows that policy A' can be false, by finding an assignment to the symbolic variables and functions that causes the policy A' to evaluate to false. Below is an example of such an assignment, where the values for the irrelevant variables and functions are omitted for brevity.

| | |
|---|---|
| 01: | P := Employee :: "Alice" |
| 02: | A := Action :: "remoteAccess" |
| 03: | f[0](e : Employee) := |
| 04: |   if e = Employee :: "Alice" |
| 05: |   then {jobLevel : 4, numberOfLaptops : 2] |
| 06: |   else {jobLevel : 1, numberOfLaptops : 1} |

The policy A' evaluates to false when the principal is Employee::"Alice", the action is Action::"remoteAccess", and the principal's attributes are f[0](Employee::"Alice") ={jobLevel: 4, numberOfLaptops: 2}.

Any field in the request or store representation can contain a symbolic literal value. In our example, only q̂[context] is a literal. But it is also possible to define a symbolic request or store in which other fields are literals too. For example, the principal field of the request to the symbolic literal SymEntity(Employee, "Jane"), or s[Employee][attributes] could be set to a concrete function definition. If every field in the request and store is a symbolic literal, then the result of the symbolic evaluation is guaranteed to be a literal as well, and the symbolic evaluator behaves exactly like evaluator of the authorization engine.

Reducing Strictly Typed Expression to SMT

Figure 16:
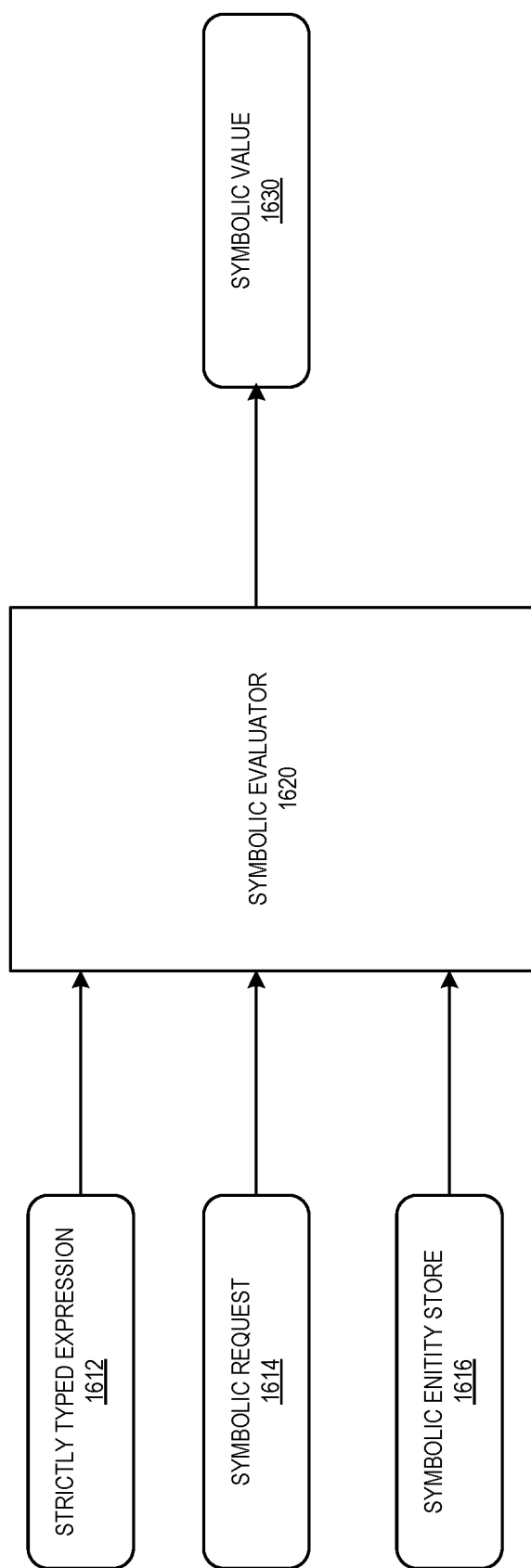
FIG. 16 illustrates Satisfiability Modulo Theories (SMT) analysis.

FIG. 16 illustrates a symbolic evaluator 1620 in a provider network 1600 for reducing a strictly typed expression to SMT. The symbolic evaluator 1620 takes as input a strictly typed expression 1612, a symbolic request 1614, and a symbolic entity store 1616. The symbolic evaluator produces a symbolic value 1630 as output. The symbolic value 1630 encodes the semantics of the strictly typed expression 1612 with respect to symbolic request 1614 and the symbolic entity store 1616.

The symbolic value 1630 are expressed in a term language. The term language includes the basic symbolic values discussed: symbolic variables, functions, and literals. All other terms are created inductively by applying symbolic operators to these basic terms. For example, Eq(q̂[action], SymEntity(Action, "remoteAccess")) produces a term that applies the equality operator to the symbolic variable 4[action] and the literal Action::"remoteAccess".

The term language has two important properties. The first property is that it is directly translatable to the SMTLib language. Each term produced by the symbolic evaluator 1620 is directly translated to SMTLib. The second property is that term constructor functions such as, for example, Eq employ sound rewrite rules to minimize the complexity of the resulting term. For example, if all arguments to a constructor function are literals, then the result is guaranteed to be a literal: Eq(SymInt(1), SymInt(2)) returns SymBool (false) rather than the application of the equality operator to the literals 1 and 2 such as, for example, Term.App2 (TermOp2.Eq, SymInt(1), SymInt(2)). These simplifications enable the symbolic evaluator 1620 to behave like the concrete evaluator when the symbolic request 1614 and the symbolic entity store 1616 consist of literals.

The symbolic evaluator 1620 operates in recursive fashion, like the evaluator of the authorization engine. To encode the strictly typed expression 1612 with n children, the symbolic evaluator 1620 encodes each child separately and then combines the resulting terms into an output term. The type of the output term matches the type of the value that would be produced by the evaluator of the authorized engine. In particular, the type of the strictly typed expression 1612 is type T according to the strict type checker, then eval(strictly typed expression e, authorization request q, term t) produces a concrete value of type Option<T> for a concrete authorization request q and concrete entity store s, while the symbolic evaluator 1620 produces a term of type Option<T>. The Option<T> type accounts for the possibility that concrete evaluation of the strictly typed expression 1612 may error due to a bug that cannot be ruled out by validation. Thus, if the evaluation errors, the result is None, and otherwise, it is Some(v) for a v of type T.

Generating Well-Formedness Assumptions on the Ancestors Relation

The symbolic evaluation function is sound and complete for all operators in the policy language except for the IN operator on entities, which tests hierarchy membership. For the IN operator, the encoding is sound but not complete. To illustrate this, consider the symbolic evaluation of the following expression:

Department::"A" in Department::"B" && Department::"B" in Department::"A".

The symbolic evaluator encodes this expression as the term And(t[0], t[1]) where:
t[0]=Contains(AppFun($\hat{s}$[Department] [ancestors][Department], A, B)=Contains(AppFun(f(6), A), B),
t[1]=Contains(AppFun(§ [Department] [ancestors][Department], B, A)=Contains(AppFun(f(6), B), A),
A=SymEntity(Department, "A"), and
B=SymEntity(Department, "B").

In other words, to check if B is an ancestor of A in the entity hierarchy, t[0] first obtains the set of all A's ancestors and then checks if this set contains B. The term t[1] does the same computation to check if A is an ancestor of B.

If the term And(t[0], t[1]) is translated to SMTLib and the SMT solver is queried whether there is an assignment under which the term evaluates to true, the SMT solver would produce a witness. For example, the SMT solver could return the following model:

| | |
|---|---|
| 01: | f(6) (d: Department) := |
| 02: | if d = Department::"A" |
| 03: | then [Department::"B"] |
| 04: | else if d = Department::"B" |
| 05: | then [Department::"A"] |
| 06: | else [ ] |

In the above model, A is mapped to the singleton set containing B and B is mapped to the singleton set containing A. The model satisfies the term. However, the model does not correspond to a valid entity hierarchy because it is not possible for two entities to be ancestors of each other in a valid entity hierarchy which is a directed acyclic graph (DAG). So, a complete encoding of the example expression would generate a term that is false under all possible assignments. In other words, unsatisfiable.

To address this issue, the encoding is strengthened with assumptions that force the ancestors relation to be irreflexive, antisymmetric, and transitive. These assumptions are generated by observing that a policy language expression may access only a bounded set of entities during evaluation. In particular, there are only two ways in which the evaluation of a policy language expression can generate an entity reference, either: (1) by evaluating an entity literal (e.g., Department::"A"), or (2) by accessing an attribute that stores an entity reference (e.g., principal.manager where manager is an Employee). So, if the set of all (1) entity literals and (2) entity-valued attribute accesses that appear in an expression are collected, then there is a way to refer to every possible entity reference that the expression may generated during evaluation.

First, this set of sub-expressions referred to as collect(e) is collected from the policy language expression e. For example, collect(e) for the above-example expression is the set [Department::"A", Department:: B" ].

Next, the set of terms $\{symeval(e[i], \hat{q}, \hat{s}) | e_i \in collect(e)\}$ is determined and referred to hereinafter as entities(e).

The assumptions can be generated in two steps:
(1) In the first step, an iteration over all terms t[i] in the set entities(e) is performed. If t[i] can have ancestors of its own type according to the memberOf relation, then the term Not(Contains(anc[i], t[i])) is emitted. Here, anc[i] is a term representing the relevant ancestors of t[i]. This assumption constrains the ancestors relation to be irreflexive on the term t[i].
(2) In the second step, an iteration over every pair of terms t[i] and t[j] in the set entities(e) is performed. If t[j] can be ancestor of t[i] according to the memberOf relation, then terms of the form Implies(Contains(anc [i], t[j]) .Subset(anc[j], anc[i])) are emitted, one for each type-correct combination of the ancestor sets of t[i] and t[j]. This assumption says that if t[j] is an ancestor of t[j], then the ancestors of t[j] must be included in the ancestor set of t[i].

Both of the above assumptions hold for any ancestors relation that represents the transitive closure of a directed acyclic graph.

For example, the assumption generator of the symbolic evaluator will emit the following terms for the above-example expression:
(1) Not(Contains(AppFun(f(6),A),A))
(2) Not(Contains(AppFun(f(6),B),B))
(3) Implies(Contains(AppFun(f(6),A),B).Subset(AppFun(f(6),B),AppFun(f(6),A)))
(4) Implies(Contains(APpFun(f(6),b),a).Subset(AppFun(f(6),A),AppFun(f(6),B)))

With these terms (1)-(4) added to the original encoding of the term And(t[0], t[1]) above, the SMT solver is no longer able to find a model, as desired.

The policy language system and method encompasses graphical user interface, command line interface, or software development kit tools that enable users to validate and analyze their provider network policies written in the policy language. The tools include a validator too (or just "validator") and a policy analyzer tool (or just "policy analyzer"). The validator can catch type errors. The policy analyzer is SMT-based and can catch logical errors.

Policy Language Term Language

The following is a formal specification of a strongly and simply typed term language that is used by the symbolic evaluator. The symbolic evaluator reduces policy language expressions to the term language during symbolic evaluation. The term language has a direct translation to SMTLib.
01: datatype TermType=
02: Bool | Int | String |
03: Entity(ety: EntityType) 1
04: Record(rty: RecordTermType) |
05: Set(ty: TermType) 1
06: Option(ty: TermType)

Each term carries its type, unless the type is easily obtained from the sub terms. Terms can be created using the factory functions defined below.

```
01:  datatype Term =
02:     Bool(b: bool) |                              // boolean literal
03:     Int(i: int) |                                // integer literal
04:     String(s: string) |                          // string literal
05:     Entity(ety: EntityType, eid: string) |       // entity literal
06:     Var(id: string, ty: TermType) |              // symbolic variable
07:     Record(rec: SymRecord) |                     // symbolic record with contents rec
08:     Get(t1: Term, attr: Attr, ty: TermType) |    // gets attribute attr of record t1
09:     Some(t1: Term) |                             // option term Some(t1)
10:     None(ty: TermType) |                         // option term None
11:     Set(elts: set<Term>, ty: TermType) |         // symbolic set with elements elts
12:     If(guard: Term, t: Term, f: Term) |          // symbolic conditional (ite) term
13:     App1(op1: TermOp1, t1: Term, ty: TermType) | // applies unary op
14:     App2(op2: TermOp2, t1: Term, t2: Term, ty: TermType)  // applies binary op
15:  {
16:   function method getType( ): TermType {
17:     match this {
18:       case Bool(_) => TermType.Bool
19:       case Int(_) => TermType.Int
20:       case String(_) => TermType.String
21:       case Entity(ety, _) => TermType.Entity(ety)
22:       case Record(rec) => TermType.Record(rec.rty)
23:       case Var(_, ty) => ty
24:       case Get(_, _, ty) => ty
25:       case Some(t1) => TermType.Option(t1.getType( ))
26:       case None(ty) => TermType.Option(ty)
27:       case Set(_, ty) => TermType.Set(ty)
28:       case If(_, t, _) => t.getType( ) case App1(_, _, ty) => ty
29:       case App2(_, _, _, ty) => ty
30:     }
31:   }
32:  }
33:
34:  type RecordTermType = map<Attr, TermType>
35:
36:  datatype SymRecord = SymRecord(rec: map<Attr, Term>, rty: RecordTermType)
```

The following is a unary uninterpreted function representing an arbitrary map from entities of a given type to records of a given type.

```
01:     datatype UnaryUF = UnaryUF(id: string, arg: TermType, out: TermType)
02:
03:     datatype TermOp1 =
04:        Not |
05:        Extract | // Retrieves the value stored in an Option term
06:        Neg |
07:        MulBy(i: int) |
08:        Like(p: Pattern) |
09:        UnaryUF(UnaryUF)
10:
11:     datatype TermOp2 = And | Or | Eq |
12:        Less | LessEq |
13:        Add | Sub |
14:        Subset | Intersect | Contains
```

The following are factory functions for creating terms:

```
01:     function method SymVar(id: string, ty: TermType): Term {
02:        Term.Var(id, ty)
03:     }
04:
05:     function method SymFun(id: string, arg: TermType, out: TermType): UnaryUF {
06:        UnaryUF(id, arg, out)
07:     }
08:
09:     function method SymEntity(ety: EntityType, eid: string): Term {
10:        Term.Entity(ety, eid)
11:     }
12:
```

```
13:    function method SymBool(b: bool): Term {
14:        if b then True else False
15:    }
16:    function method SymInt(i: int): Term {
17:        Term.Int(i)
18:    }
19:
20:    function method Eq(t1: Term, t2: Term): Term {
21:        if t1 == t2
22:        then True
23:        else if t1.isLiteral( ) && t2.isLiteral( ) then False
24:        else Term.App2(TermOp2.Eq, t1, t2, TermType.Bool)
25:    }
26:
27:    function method ITE(g: Term, t: Term, f: Term): Term {
28:        if g == True || t == f then t
29:        else if g == False then f
30:        else Term.If(g, t, f)
31:    }
32:
33:    function method IsNone(t1: Term): Term {
34:        match t1 {
35:            case None(_) => True
36:            case Some(_) => False
37:            case If(_, Some(_), Some(_)) => False
38:            case If(g, None(_), Some(_)) => g
39:            case If(g, Some(_), None(_)) => not(g)
40:            case _ = > Eq(t1, None(t1.getType( ).ty))
41:        }
42:    }
43:
44:    function method Less(t1: Term, t2: Term): Term {
45:        if (t1.Int? && t2.Int?)
46:        then SymBool(t1.i < t2.i)
47:        else Term.BinaryApp(TermOp2.Less, t1, t2, TermType.Bool)
48:    }
49:
50:    function method Get(t1: Term, attr: Attr): Term { ... }
51:
52:    function method AppFun(uf: UF, t1: Term): Term { ... }
53:
54:    function method Extract(t1: Term): Term {
55:        match t1 {
56:            case Some(t) => t
57:            case _ => Term.App1(TermOp1.Extract, t1, t1.getType( ).ty)
58:    }
```

Example Provider Network Environment

Figure 17:
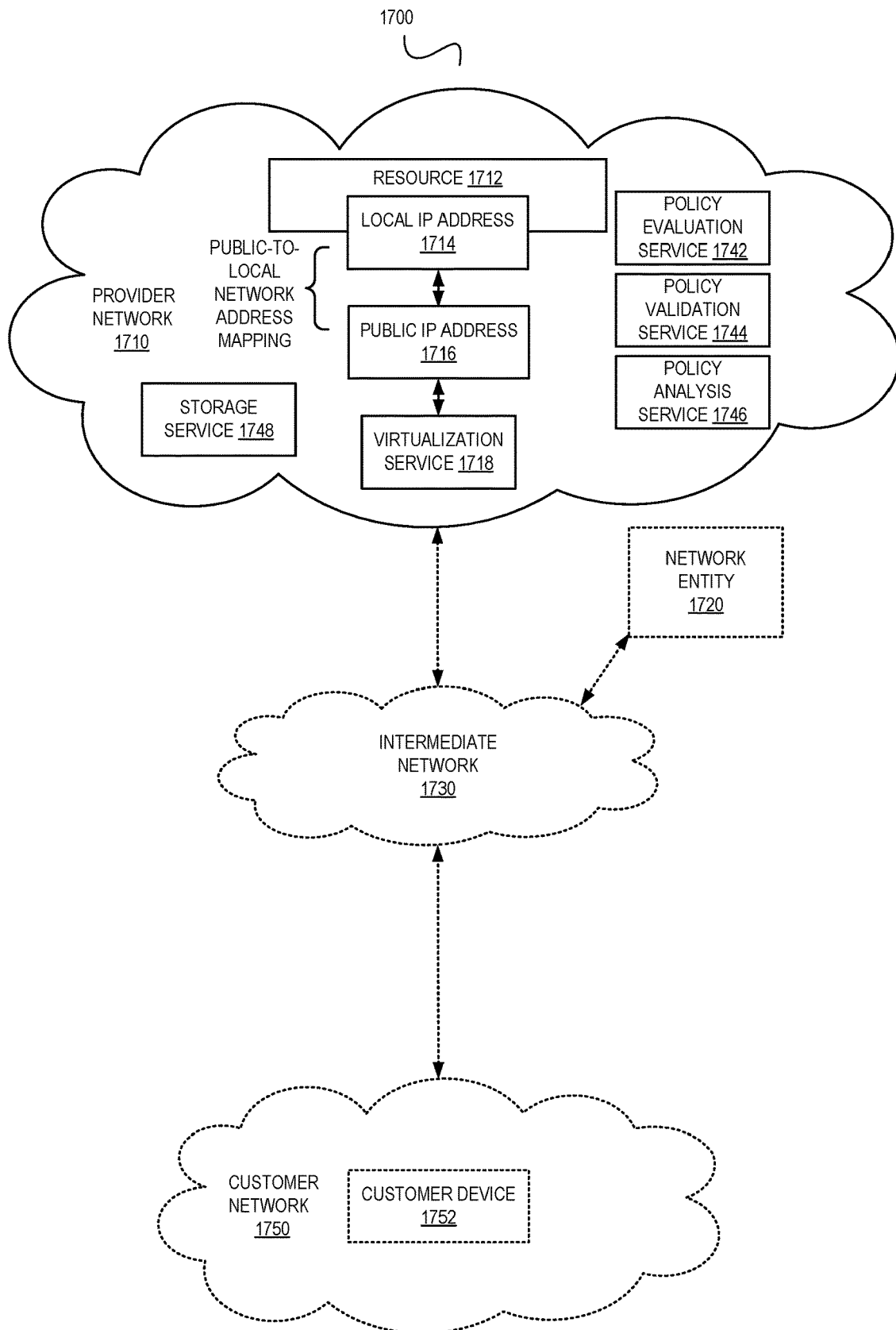
FIG. 17 illustrates an example of a provider network environment in which the techniques disclosed herein are implemented.

FIG. 17 illustrates an example provider network environment 1700 in which the techniques disclosed herein are implemented. The environment 1700 includes a provider network 1710 and an optional intermediate network 1730 and an optional customer network 1750. While the intermediate network 1730 and the customer network 1750 are depicted in FIG. 17 as being external to the provider network 1710, the intermediate network 1730 and the customer network 1750 can alternatively be within the provider network 1710. The provider network 1710 provides resource virtualization to a customer of the provider network 1710 via a virtualization service 1718. The virtualization service 1718 allows the customer to purchase, rent, subscribe to, or otherwise obtain use of one or more resources (e.g., resource 1712).

The provider network 1700 includes a policy evaluation service 1742 for evaluating authorization policies according to techniques disclosed herein, a policy validation service 1744 for validating policies according to techniques disclosed herein, and a policy analysis service 1746 for analyzing authorization policies according to techniques disclosed herein. Services 1742, 1744, or 1746 can be offered via an API to other services (including to each other) in the provider network 1710. Additionally or alternatively, services 1742, 1744, or 1746 can be offered via an API and intermediate network 1730 to customer devices in customer networks (e.g., customer device 1752 in customer network 1750) or to other network entities (e.g., network entity 1720).

The provider network 1710 functions to provide a computing environment in which the techniques disclosed herein may be implemented. The provider network 1710 is programmed or configured to adhere to a cloud computing model. The model enables ubiquitous, convenient, on-demand network access to a shared pool of configurable resources such as virtual machines, containers, networks, servers, storage, applications, services, or any other configurable resource of the provider network 1710. The resources can be rapidly provisioned and released with minimal management effort or service provider interaction.

A user of the provider network 1710 (sometimes referred to herein as a "customer" of the provider network 1710) provisions resources in the provider network 1710, such as virtual machines, containers, server time, network storage, or any other resource, as needed automatically with minimal or no human interaction with the service provider. Resources of the provider network 1710 may be available over an intermediate network (e.g., the Internet) and accessed through standard mechanisms that promote use by heterogeneous remote electronic devices such as thin or thick client platforms or any other type of computing platform such as desktop computers, mobile phones, tablet computers, laptop computers, workstation computers, smart appliances, Internet-of-Things (IoT) devices, or any other type of electronic device.

Resources such as compute, storage, processing, memory, and network resources in the provider network 1710 are pooled to serve multiple customers using a multi-tenant model, with different physical and virtual resources dynamically assigned and reassigned according to customer demand. There is a sense of location independence in that the customer generally has no control or knowledge over the exact location of provided resources but can specify location at a higher level of abstraction such as, for example, at the level of a country, state, datacenter, or any other location granularity. The provider network 1710 automatically controls and optimizes resource use by leveraging a metering capability (e.g., on a pay-per-use, on a charge-per-use basis, on a subscription basis, or any other fee basis) at a level of abstraction appropriate to the type of service such as compute, storage, processing, memory, network bandwidth, active customer accounts, or any other suitable level of abstraction. Resource usage in the provider network 1710 is monitored, controlled, and reported, providing transparency for both the provider and the customer of a utilized service.

The provider network 1710 can provide its capabilities to customers according to a variety of different service models including Software-as-a-Service (SaaS), Platform-as-a-Service (PaaS), Infrastructure-as-a-Service (IaaS), or any other service model.

With SaaS, a capability is provided to a customer using the provider network 1710's software applications running on the infrastructure of the provider network 1710. The applications may be accessible from various remote electronic devices through either a thin client interface such as a command line interface (CLI), a graphical user interface (GUI) (e.g., via a web browser or a mobile or web application), a Software Development Kit (SDK), or any other interface. The infrastructure of the provider network 1710 includes the hardware resources such as server, storage, and network resources and software deployed on the hardware infrastructure that support the services being provided. Typically, under the SaaS model, the customer does not manage or control the underlying infrastructure including network, servers, operating systems, storage, or individual application capabilities, except for limited customer-specific application configuration settings.

With PaaS, the customer is provided the capability to deploy, onto hardware and software infrastructure of the provider network 1710, customer-created or acquired applications using programming languages, libraries, services, and tools supported by the provider network 1710 or other sources. Typically, under the PaaS model, the customer does not manage or control the underlying hardware and software infrastructure including network, servers, operating systems, or storage, but can have control over the deployed applications and possibly configuration settings for the application-hosting environment.

With IaaS, the customer is provided the capability to provision processing, storage, networks, and other fundamental computing resources where the customer can deploy and run arbitrary software, which can include operating systems and applications. The customer typically does not manage or control the underlying hardware and software infrastructure but can have control over operating systems, storage, and deployed applications and possibly limited control of selecting network components such as, for example, host firewalls.

The provider network 1710 can provide its capabilities to a customer according to a variety of different deployment models including as a private cloud, as a community cloud, as a public cloud, as a hybrid cloud, or any other deployment model.

In a private cloud, the hardware and software infrastructure of the provider network 1710 is provisioned for exclusive use by a single organization which can comprise multiple customers. The private cloud is owned, managed, and operated by the organization, a third party, or some combination of them, and it can exist on or off premises.

In a community cloud, the hardware and software infrastructure of the provider network 1710 is provisioned for exclusive use by a specific community of customers from organizations that have shared concerns such as mission security requirements, policy, and compliance considerations. The community cloud is owned, managed, and operated by one or more of the organizations in the community, a third party, or some combination of them, and it can exist on or off premises.

In a public cloud, the infrastructure is provisioned for open use by the public. The public cloud is owned, managed, and operated by a business, academic, or government organization, or some combination of them. A public cloud can exist on the premises of the public cloud provider.

In a hybrid cloud, the infrastructure is a composition of two or more distinct cloud infrastructures (private, community, public, or any other cloud infrastructure) that remain unique entities, but that are bound together by standardized or proprietary technology that enables data and application portability such as, for example, cloud bursting for load balancing between clouds.

The resource 1712 is a compute, storage, or network resource. The resource 1712 is implemented by an electronic device in a datacenter within the provider network 1710. The datacenter is a physical facility or building that houses compute, storage, and network infrastructure. The provider network 1710 encompasses many resources implemented by many electronic devices distributed over a set of datacenters located in different geographic regions or locations. An example of an electronic device is device 1800 described below with respect to FIG. 18.

An example of the resource 1712 is a virtual machine (VM). A virtual machine is a compute resource that uses software instead of a physical computer to run a program and deploy an application. A virtual machine (sometimes called a "guest machine") can run on a single physical machine (sometimes called the "host machine"). A virtual machine can execute its own operating system (e.g., UNIX, WINDOWS, LINUX, etc.) and can function separately at least in part from other virtual machines, including those on the same host machine. A virtual machine can be a substitute for a physical machine. A host machine's physical resources can be shared between multiple virtual machines each running its own copy of an operating system. Access to and use of the host machine's physical resources (e.g., hardware processor and physical memory resources) by the multiple virtual machines can be coordinated by a virtual machine monitor (sometimes called a "hypervisor"). The hypervisor itself can run on the bare hardware of the host machine or as a process of an operating system that runs on the bare hardware.

Another example of the resource 1712 is a container. A container is like a virtual machine with respect to running separate applications on a single platform. However, a container typically encapsulates a single application or a set of one or more related applications along with runtime dependencies and libraries, while a virtual machine virtualizes the hardware to create a "computer." Another difference is that a container system typically provides the services of an operating system kernel that runs on the bare hardware of the underlying host machine to containers that share the kernel services as orchestrated by the container system. The container system itself can run on the host machine with the aid of the operating system kernel and can isolate the containers from each other to a certain degree. While a container can be used independently of a virtual machine, a container and a virtual machine can be used together. For example, a container can run on an operating system that runs on a virtual machine that runs on a host machine.

While resource 1712 can be a virtual machine or a container, resource 1712 can be any suitable type of compute, data storage, or network resource in the provider network 1700.

Within the provider network 1710 a local Internet Protocol (IP) address 1714 is associated with the resource 1712. The local IP address 1714 includes an internal or private network address in the provider network 1710. The local IP address 1714 can be an IPv4 or IPv6 address, for example. For example, the local IP address 1714 can be one reserved by Internet Engineering Task Force (IETF) Request for Comments (RFC) 1918 or having an address format specified by IETF RFC 4193 and can be mutable within the provider network 1710.

Network traffic originating from a network entity 1720 coupled to the intermediate network 1730 or from a customer device 1752 in the customer network 1750 that is destined for the resource 1712 in the provider network 1710 typically is not directly routed to the local IP address 1714. Instead, the network traffic is addressed to a public IP address 1716. The public IP address 1716 can be mapped within the provider network 1710 to the local IP address 1714 using network address translation (NAT) or similar technology.

Using the customer device 1752 in the customer network 1750, the customer uses, controls, operates, or benefits from the virtualization service 1718, the resource 1712, the local IP address 1714, and the public IP address 1716 to implement a customer-specific application and offer the application to one or more network entities (e.g., network entity 1720) on the intermediate network 1730. The network entity 1720 can generate network traffic destined for the application by addressing the network traffic for the public IP address 1716. The traffic can be routed via the intermediate network 1730 to the datacenter of the provider network 1710 which houses the electronic device that implements the resource 1712. Within the data center, the traffic can be routed to the local IP address 1714 where the traffic is received and processed by the resource 1712. Response network traffic from the resource 1712 can be routed back onto the intermediate network 1730 to the network entity 1720.

The provider network 1710 can also provide a storage service 1748 to customers. For example, storage service 1748 can be used to store authorization data, entity stores, authorization policies, and authorization policy schemas. The storage service 1748 can provide an API to access data from and store data to storage resources of a virtual data store (e.g., a folder or "bucket", virtualized volume, a database, etc.) provided by the provider network 1710.

Example Electronic Device

Figure 18:
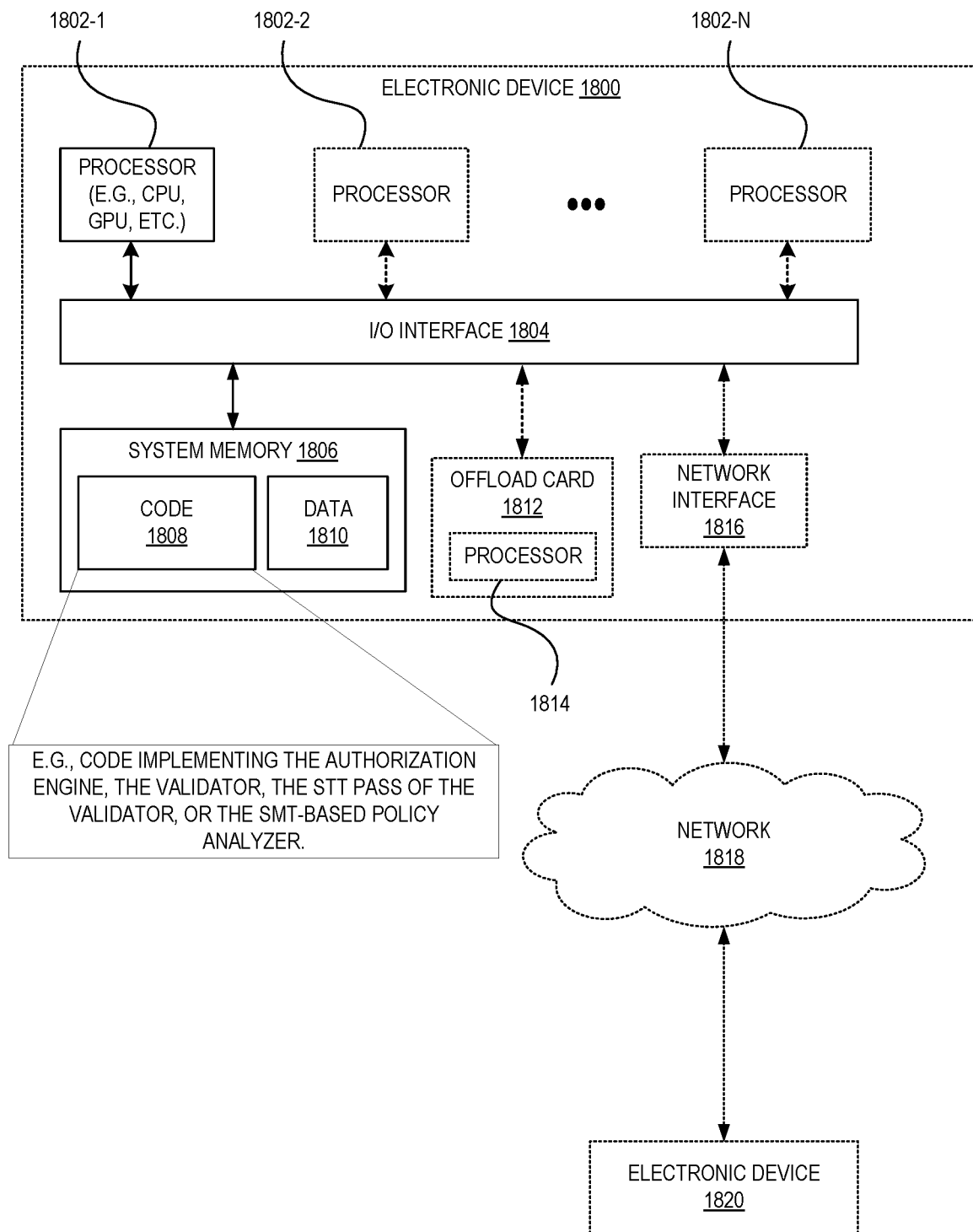
FIG. 18 illustrates an example of an electronic device that is used in an implementation of the techniques disclosed herein.

FIG. 18 illustrates an example electronic device 1800 that is used in an implementation of the techniques disclosed herein. Device 1800 includes a set of one or more processors 1802-1, 1802-2, . . . , 1802-N coupled to system memory 1806 via an input/output (I/O) interface 1804. The device 1800 can further include a network interface 1816 coupled to the I/O interface 1804.

The device 1800 is a uniprocessor system including one processor or is a multiprocessor system including multiple processors. Each of processors 1802-1, 1802-2, . . . , 1802-N is any suitable processor capable of executing instructions. For example, each of the processors 1802-1, 1802-2, . . . , 1802-N can be general-purpose or embedded processor implementing any of a variety of instruction set architectures (ISAs), such as the X86, ARM, POWERPC, SPARC, or MIPS ISAs, or any other suitable ISA.

The system memory 1806 stores instructions and data accessible by the processor(s) 1802-1, 1802-2, . . . , 1802-N. The system memory 1806 is implemented using any suitable memory technology, such as random-access memory (RAM), static RAM (SRAM), synchronous dynamic RAM (SDRAM), nonvolatile or Flash-type memory, or any other type of memory. Program instructions 1808 and data 1810 implementing a desired function, such as a method, process, act, or operation of the techniques disclosed herein, are stored within the system memory 1806 as code 1808 (e.g., executable to implement, in whole or in part, a method, process, act, or operation performed by the authorization engine, the validator, the STT pass of the validator, or the SMT-based policy analyzer) and data 1810.

The I/O interface 1804 is configured to coordinate I/O traffic between the processor(s) 1802-1, 1802-2, . . . , 1802-N, the system memory 1806, and any peripheral devices in device 1800, including, optionally, a network interface 1816 or other peripheral interfaces (not shown). The I/O interface 1804 performs any necessary protocol, timing, or other data transformations to convert data signals from one component (e.g., the system memory 1806) into a format suitable for use by another component (e.g., the processor(s) 1802-1, 1802-2, . . . , 1802-N).

The I/O interface 1804 includes support for devices attached through various types of peripheral buses, such as a variant of the PERIPHERAL COMPONENT INTERCONNECT (PCI) bus standard or the UNIVERSAL SERIAL BUS (USB) standard, for example (e.g., a bus implementing a version of the PERIPHERAL COMPONENT INTERCONNECT—EXPRESS (PCI-E) standard, or another interconnect such as a QUICKPATH INTERCONNECT (QPI) or ULTRAPATH INTERCONNECT (UPI)). The function of the I/O interface 1804 can be split into two or more separate components, such as a north bridge and a south bridge, for example. Also, some of the functionality of the I/O interface 1804, such as an interface to the system memory 1806, can be incorporated directly into the processor(s) 1802-1, 1802-2, . . . , 1802-N.

An optional network interface 1816 is configured to allow data to be exchanged between device 1800 and another electronic device 1820 attached to device 1800 via a network 1818. The network interface 1816 supports communication via any suitable wired or wireless networks, such as a type of wired or wireless Ethernet network, for example. Additionally, the network interface 1816 can support communication via telecommunications or telephony networks, such as analog voice networks or digital fiber communications networks, via storage area networks (SANs), such as FIBRE CHANNEL SANs, or via any other suitable type of network or protocol.

The device 1800 optionally includes an offload card 1812 including a processor 1814, and possibly including a network interface (not depicted), that is connected using the I/O interface 1804. For example, device 1800 can act as a host electronic device (e.g., operating as part of a hardware virtualization service) that hosts compute resources such as compute instances, and the offload card 1812 can execute a virtualization manager that can manage compute instances that execute on the host electronic device 1800. As an example, the offload card 1812 can perform compute instance management operations, such as pausing or un-pausing compute instances, launching or terminating compute instances, performing memory transfer/copying operations, etc. These management operations can be performed by the offload card in coordination with a hypervisor (e.g., upon a request from a hypervisor) that is executed by the processor(s) 1802-1, 1802-2, . . . , 1802-N of device 1800. However, the virtualization manager implemented by the offload card 1812 can accommodate requests from other entities (e.g., from compute instances themselves).

The system memory 1806 encompasses one or more computer-accessible media configured to store program instructions 1808 and data 1810. However, program instructions 1808 or data 1810 can be received, sent, or stored upon different types of computer-accessible media. Computer-accessible media includes non-transitory computer-accessible media and computer-accessible transmission media. Examples of non-transitory computer-accessible media include volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD).

Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

Terminology

Ordinal terms such as first, second, etc. may be used in the foregoing description and in the appended claims to describe various elements, features, acts, or operations. Unless the context clearly indicates otherwise, such elements, features, acts, or operations are not limited by those terms. The terms are used only to distinguish one element, feature, act, or operation from another. For example, a first device could be termed a second device. The first device and the second device are both devices, but they are not the same device.

Unless the context clearly indicates otherwise, as used in the foregoing description and in the appended claims, the singular forms "a," "an," and "the" are intended to include the plural forms as well.

Unless the context clearly indicates otherwise, as used in the foregoing description and in the appended claims, the terms "comprising," "including," "having," "based on," "encompassing," and other like terms, are used in the foregoing description and in the appended claims in an open-ended fashion, and do not exclude additional elements, features, acts, or operations.

In the case of "based on," the term is used in the foregoing description and in the appended claims in some instances to identify a causal relationship between stated steps, acts or operations. Unless the context clearly indicates otherwise, "A based on B" in these instances means that the performance of step, act, or operation B causes the performance of step, act, or operation A. The causal relationship can be direct (via no intermediate steps, acts, or operations) or indirect (via the performance of one or more intermediate steps, acts, or operations). However, unless the context clearly indicates otherwise, the term "A based on B" is not intended to require the performance of B be necessary in all cases to cause the performance of A, and A may be performed in some cases without being caused by the performance of B. In those cases, however, A would not be based on B even though A is based on B in other cases. Further, unless the context clearly indicates otherwise, the term "A based on B" is not intended to require that the performance of B by itself be sufficient in all cases to cause the performance of A, and one or more other steps, acts, or operations in addition to B may be performed in some cases to cause the performance of A. In such circumstances, A can still be based on B even though multiple steps, acts, or operations including B are performed to cause A.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language does not require that at least one of X, at least one of Y, and at least one of Z to each be present.

It will be clear to one skilled in the art that the above examples may be altered in many ways without departing from the scope of the invention. Accordingly, the scope of the invention should be determined by the following claims and their legal equivalents.

What is claimed is:

1. A method performed by one or more electronic devices in a provider network, the method comprising:
   receiving, by a policy language engine in the provider network, an authorization request from a provider network application in the provider network, wherein the policy language engine is to govern access to one or more resources of the provider network based at least in part on authorization policies in an authorization policy language, and wherein the provider network application provides to the policy language engine entity data in a serialized format, which can be deserialized to construct an entity ancestor map and an entity attribute map for indexing associated entities and attributes in an entity store;
   identifying a set of the authorization policies, wherein each authorization policy in the set of the authorization policies comprises:
   a) an effect;
   b) an authorization policy head that selects principals, actions, or resources to which the authorization policy applies; and c) one or more optional conditional clauses that further refine circumstances under which the authorization policy applies;

pruning at least one authorization policy, of the set of the authorization policies, from evaluation against the authorization request based on the authorization policy head of the at least one authorization policy, thereby generating a subset of the set of authorization policies;

evaluating the subset of authorization policies against the authorization request; and allowing or denying the authorization request based on the evaluating of the subset of authorization policies.

2. The method of claim 1, further comprising:

storing a set of entities arranged in an entity hierarchy; and wherein the at least one authorization policy further comprises at least one expression in terms of one or more entities in the entity hierarchy.

3. The method of claim 1, wherein pruning the at least one authorization policy from evaluation against the authorization request based on the authorization policy head of the at least one authorization policy is further based on:

determining a resource identifier of a resource from the authorization request;

determining a set of entity identifiers of a set of entities in an entity hierarchy that are ancestors of the resource in the entity hierarchy; and determining a set of authorization policies each having a head resource matching either the resource identifier or an entity identifier in the set of entity identifiers.

4. A method performed by one or more electronic devices, the method comprising:

receiving, by a policy language engine in a provider network, an authorization request from a provider network application in the provider network, wherein the policy language engine is to govern access to one or more resources of the provider network based at least in part on authorization policies in an authorization policy language, and wherein the provider network application provides to the policy language engine entity data in a serialized format, which can be deserialized to construct an entity ancestor map and an entity attribute map for indexing associated entities and attributes in an entity store;

identifying a set of authorization policies, wherein each authorization policy in the set of the authorization policies comprises:
  (a) an effect;
  (b) an authorization policy head that selects principals, actions, or resources to which the authorization policy applies; and
  (c) one or more optional conditional clauses that further refine circumstances under which the authorization policy applies;

pruning at least one authorization policy of the set of the authorization policies, from evaluation against the authorization request based on the authorization policy head of the at least one authorization policy, thereby generating a subset of the set of authorization policies;

evaluating the subset of authorization policies against the authorization request; and allowing or denying the authorization request based on the evaluating of the subset of authorization policies.

5. The method of claim 4, further comprising:

storing a set of entities arranged in an entity hierarchy; and wherein one or more authorization policies in the set of authorization policies each further comprises at least one expression in terms of one or more entities in the entity hierarchy.

6. The method of claim 4, wherein pruning the of the at least one authorization policy from evaluation against the authorization request based on the authorization policy head is further based on:

determining a principal identifier of a principal from the authorization request;

determining a set of entity identifiers of a set of entities in an entity hierarchy that are ancestors of the principal in the entity hierarchy; and determining a second set of authorization policies each having a head resource matching either the principal identifier or an entity identifier in the set of entity identifiers.

7. The method of claim 6, further comprising determining a subset of the second set of authorization polices wherein, for each authorization policy in the subset of the second set, a set of head constraints of the authorization policy evaluates to true against the authorization request.

8. The method of claim 6, the authorization policy evaluation service further comprising instructions which when executed cause the authorization policy evaluation service to further perform determining a subset of the second set of authorization polices wherein for each authorization policy in the subset of the second set, a set of head constraints of the authorization policy evaluates to true against the authorization request.

9. The method of claim 4, further comprising:

determining needed entity data from the subset of the set of authorization policies;

sending a query to an entity store to fetch a first set of entity data;

receiving the first set of entity data from the entity store;

wherein the second authorization policy comprises a chain of two or more entity references;

determining that the first set of entity data comprises particular entity data for a particular entity reference in the chain of two or more entity references; and determining that sending an additional query to the entity store to fetch the particular entity data is not needed based on determining that the first set of entity data comprises the particular entity data.

10. The method of claim 4, wherein:

the authorization request specifies a first particular principal;

the head of a particular authorization policy in the subset of the set of authorization policies comprises a hierarchy constraint expression in terms of a second particular principal; and the method further comprises evaluating the head of the second authorization policy based on accessing an entity ancestors map that maps the first particular principal to a set of particular principals that are ancestors of the first particular principal in an entity hierarchy, and determining that the second particular principal is in the set of particular principals that are ancestors of the first particular principal in the entity hierarchy.

11. The method of claim 4, wherein:

the authorization request specifies a first particular entity;

a condition of a particular authorization policy in the subset of the set of authorization policies comprises an expression that accesses an attribute of an entity; and the method further comprises evaluating the condition of the particular policy based on accessing an entity attributes map that maps the first particular entity to an attribute record of the first particular entity, and accessing the attribute of the attribute record.

12. The method of claim 4, further comprising:
randomly generating a test input;
running a production policy authorization engine and a reference policy authorization engine on the test input, wherein the reference policy authorization engine is implemented using a theorem proving programming language;
obtaining a first output of the production policy authorization engine on the test input;
obtaining a second output of the reference authorization engine on the test input; and
comparing the first output to the second output.

13. The method of claim 4, further comprising:
receiving the authorization request from a provider network application in the provider network; and
returning a response to the authorization request to the provider network application, the response indicating that the authorization request is denied.

14. The method of claim 4, wherein a policy in the set of authorization policies comprises a set of one or more role-based access control expressions that are syntactically separate from a set of one or more attribute-based access control expressions of the policy.

15. The method of claim 4, the authorization policy evaluation service further comprising instructions which when executed cause the authorization policy evaluation service to further perform:
storing a set of entities arranged in an entity hierarchy; and
wherein one or more authorization policies in the set of authorization policies each further comprises at least one expression in terms of one or more entities in the entity hierarchy.

16. The method of claim 4, wherein pruning the of the at least one authorization policy from evaluation against the authorization request based on the authorization policy head is further based on:
determining a principal identifier of a principal from the authorization request;
determining a set of entity identifiers of a set of entities in an entity hierarchy that are ancestors of the principal in the entity hierarchy; and
determining a second set of authorization policies each having a head resource matching either the principal identifier or an entity identifier in the set of entity identifiers.

17. The method of claim 4, the authorization policy evaluation service further comprising instructions which when executed cause the authorization policy evaluation service to further perform:
determining needed entity data from the subset of the set of authorization policies;
sending a query to an entity store to fetch a first set of entity data;
receiving the first set of entity data from the entity store;
wherein the second authorization policy comprises a chain of two or more entity references;
determining that the first set of entity data comprises particular entity data for a particular entity reference in the chain of two or more entity references; and
determining that sending an additional query to the entity store to fetch the particular entity data is not needed based on determining that the first set of entity data comprises the particular entity data.

18. The method of claim 4, wherein:
the authorization request specifies a first particular principal;
the head of a particular authorization policy in the subset of the set of authorization policies comprises a hierarchy constraint expression in terms of a second particular principal; and
the authorization policy evaluation service further comprising instructions which when executed cause the authorization policy evaluation service to further perform evaluating the head of the second authorization policy based on accessing an entity ancestors map that maps the first particular principal to a set of particular principals that are ancestors of the first particular principal in an entity hierarchy, and determining that the second particular principal is in the set of particular principals that are ancestors of the first particular principal in the entity hierarchy.

19. The method of claim 4, wherein:
the authorization request specifies a first particular entity;
a condition of a particular authorization policy in the subset of the set of authorization policies comprises an expression that accesses an attribute of an entity; and
the authorization policy evaluation service further comprising instructions which when executed cause the authorization policy evaluation service to further perform evaluating the condition of the particular policy based on accessing an entity attributes map that maps the first particular entity to an attribute record of the first particular entity, and accessing the attribute of the attribute record.

20. A system comprising:
a first set of one or more electronic devices to implement an authorization policy evaluation service in a provider network, the authorization policy evaluation service comprising instructions which when executed cause the authorization policy evaluation service to perform:
receiving, by a policy language engine of the authorization policy evaluation service, an authorization request from a provider network application in the provider network, wherein the policy language engine is to govern access to one or more resources of the provider network based at least in part on authorization policies in an authorization policy language, and wherein the provider network application provides to the policy language engine entity data in a serialized format, which can be deserialized to construct an entity ancestor map and an entity attribute map for indexing associated entities and attributes in an entity store;
identifying a set of authorization policies, wherein each authorization policy in the set of the authorization policies comprises:
(a) an effect;
(b) an authorization policy head that selects principals, actions, or resources to which the authorization policy applies; and
(c) one or more optional conditional clauses that further refine circumstances under which the authorization policy applies;
pruning at least one authorization policy of the set of the authorization policies, from evaluation against the authorization request based on the authorization policy head of the at least one authorization policy, thereby generating a subset of the set of authorization policies;

evaluating the subset of authorization policies against the authorization request; and allowing or denying the authorization request based on the evaluating of the subset of authorization policies.

\* \* \* \* \*